United States Patent
Kim et al.

(10) Patent No.: US 10,440,356 B2
(45) Date of Patent: Oct. 8, 2019

(54) ELECTRONIC APPARATUS DISPLAYING A REGION OF A 360 DEGREE VIEW AND METHOD OF OPERATING THE SAME

(71) Applicant: SAMSUNG ELECTRONICS CO., LTD., Suwon-si (KR)

(72) Inventors: Bo-eun Kim, Seoul (KR); Sung-hyun Kim, Yongin-si (KR); Yong-deok Kim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/656,133

(22) Filed: Jul. 21, 2017

(65) Prior Publication Data
US 2018/0054612 A1 Feb. 22, 2018

(30) Foreign Application Priority Data

Aug. 16, 2016 (KR) .................. 10-2016-0103755

(51) Int. Cl.
*H04N 13/388* (2018.01)
*G09G 5/00* (2006.01)
(Continued)

(52) U.S. Cl.
CPC ......... *H04N 13/398* (2018.05); *G06F 3/1446* (2013.01); *G09G 5/003* (2013.01);
(Continued)

(58) Field of Classification Search
CPC .. H04N 13/398; H04N 13/302; H04N 13/324; G06F 3/1446; G09G 5/003;
(Continued)

(56) References Cited

U.S. PATENT DOCUMENTS

2005/0285811 A1* 12/2005 Kawase ............ G02F 1/13336
345/1.1
2006/0050074 A1* 3/2006 Bassi ................... G06T 3/0006
345/427
(Continued)

FOREIGN PATENT DOCUMENTS

JP 2007-325002 A 12/2007
KR 10-2007-0061033 A 6/2007

OTHER PUBLICATIONS

International Search Report and Written Opinion, issued by International Searching Authority in corresponding International Application No. PCT/KR2017/007556, dated Oct. 30, 2017, (PCT/ISA/220, PCT/ISA/210 & PCT/ISA/237).

*Primary Examiner* — Stephen G Sherman
(74) *Attorney, Agent, or Firm* — Sughrue Mion, PLLC

(57) ABSTRACT

Provided are an electronic apparatus and a method of operating the same. The electronic apparatus includes a display and a controller electrically connected to the display, wherein the controller identifies at least one of aspect ratio information of the display, a type of the display, and curvature information of the display, determines an angle of view of a 360 degree image to be displayed on the display based on at least one of the identified aspect ratio information of the display, and type of the display, and curvature information of the display, and controls the display to display a region of the 360 degree image according to the determined angle of view.

22 Claims, 16 Drawing Sheets

(51) Int. Cl.
*H04N 13/398* (2018.01)
*H04N 13/302* (2018.01)
*H04N 13/324* (2018.01)
*G06F 3/14* (2006.01)

(52) U.S. Cl.
CPC ......... *H04N 13/302* (2018.05); *H04N 13/324* (2018.05); *G09G 2300/026* (2013.01); *G09G 2340/0442* (2013.01); *G09G 2356/00* (2013.01); *G09G 2380/08* (2013.01)

(58) Field of Classification Search
CPC ..... G09G 2300/026; G09G 2340/0442; G09G 2356/00; G09G 2380/08
See application file for complete search history.

(56) References Cited

U.S. PATENT DOCUMENTS

| | | |
|---|---|---|
| 2007/0139626 A1 | 6/2007 | Saleh et al. |
| 2010/0141683 A1 | 6/2010 | van der Meulen |
| 2010/0177019 A1* | 7/2010 | Jeong ................ H04N 1/00347 345/1.3 |
| 2011/0234640 A1 | 9/2011 | Ishida |
| 2011/0285704 A1* | 11/2011 | Takeda .................. A63F 13/525 345/419 |
| 2014/0285777 A1 | 9/2014 | Inoue |
| 2014/0351763 A1 | 11/2014 | Lee et al. |
| 2016/0180577 A1* | 6/2016 | Jang ........................ G06T 15/08 345/419 |

\* cited by examiner

FIG. 1
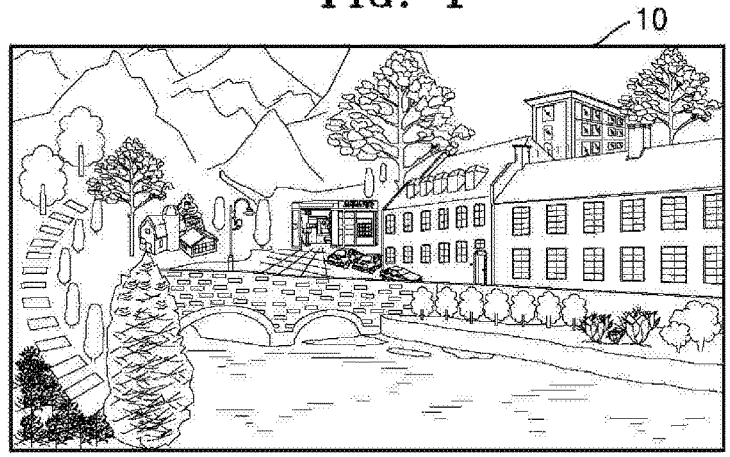
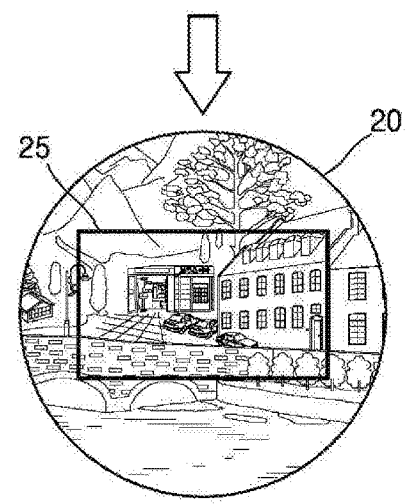
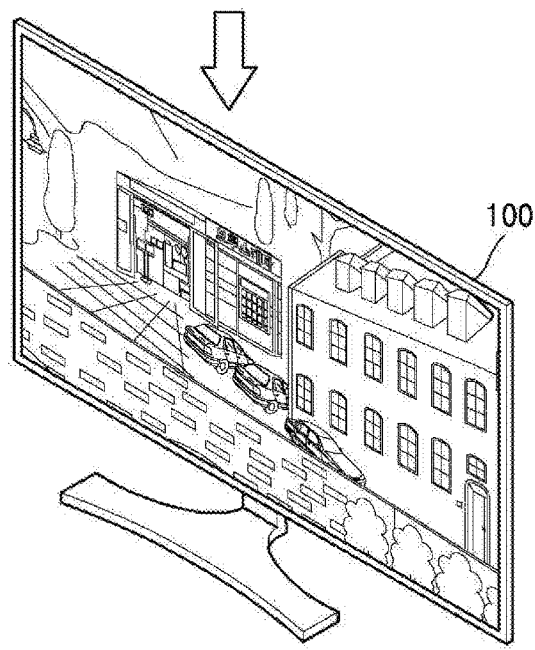

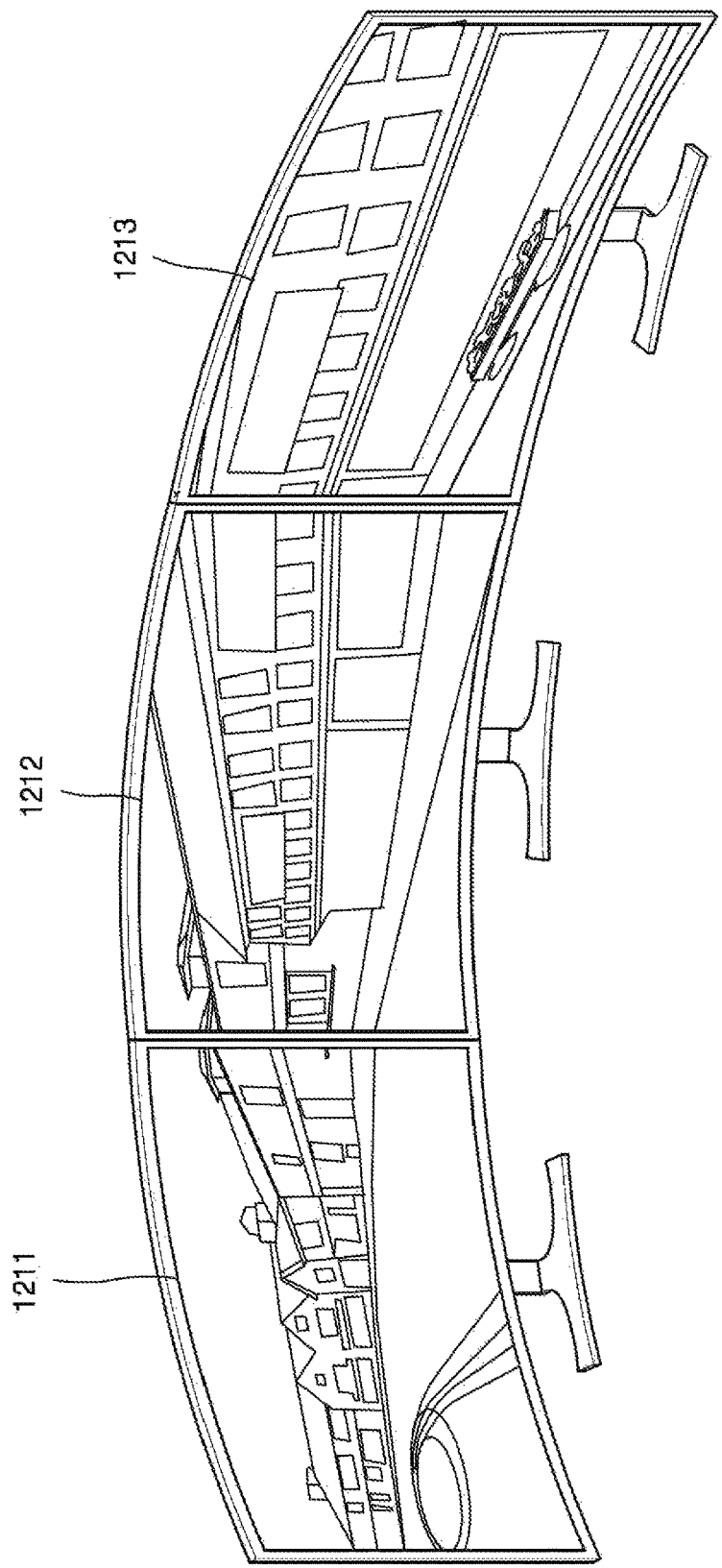

ELECTRONIC APPARATUS DISPLAYING A REGION OF A 360 DEGREE VIEW AND METHOD OF OPERATING THE SAME

CROSS-REFERENCE TO RELATED APPLICATION

This application claims the benefit of Korean Patent Application No. 10-2016-0103755, filed on Aug. 16, 2016, in the Korean Intellectual Property Office, the disclosure of which is incorporated herein in its entirety by reference.

BACKGROUND

1. Field

The present disclosure relates to a method of displaying an image using an electronic apparatus, and more particularly, to an electronic apparatus for displaying a 360 degree image and a method of operating the same.

2. Description of the Related Art

An electronic apparatus, which includes a display or is electrically connectable to a display, may display an image that a user may view. The user may view a broadcast or electronic content through the electronic apparatus. The electronic apparatus can display a broadcast content according to a broadcast signal selected by the user among broadcasting signals, which are transmitted from broadcast stations, on the display, or the electronic content. Currently, the broadcasting has been globally changed from analog broadcasting to digital broadcasting.

Digital broadcasting refers to broadcasting that transmits digital image and audio signals. The digital broadcasting has low data loss, is advantageous for error correction, has high resolution, and provides a clear screen, as compared to analog broadcasting. Further, a bidirectional service is available in the digital broadcasting unlike the analog broadcasting.

In addition, smart TV's that can display various content in addition to a digital broadcasting function have been recently provided. A goal of smart TV technology is not to operate manually according to a user's selection, but to analyze and provide what the user desires without a user's manipulation.

On the other hand, the electronic apparatus may also reproduce panoramic images or captured 360 degree images, which are being used with increasing frequency. However, there is a problem with conventional displays in that the conventional display always displays a constant angle of view with respect to a 360 degree image, regardless of a type of the display.

SUMMARY

Provided are an electronic apparatus for varying a display range of an image which is displayed on a screen among a 360 degree image on the basis of aspect ratio information of a display and/or a type and curvature information of the display, and a method of operating the same.

Additional aspects will be set forth in part in the description which follows and, in part, will be apparent from the description, or may be learned by practice of the presented embodiments.

According to an aspect of an embodiment, an electronic apparatus includes a display and a controller electrically connected to the display, wherein the controller identifies at least one of aspect ratio information of the display, and a type of the display, and curvature information of the display, determines an angle of view of a 360 degree image to be displayed on the display on the basis of at least one of the identified aspect ratio information of the display, and type of the display, and curvature information of the display, and controls the display to display a region of the 360 degree image according to the determined angle of view.

The controller may determine a method of reproducing an image on the basis of the determined angle of view and the identified type and curvature information of the display, and display an image corresponding to the determined angle of view on the display using the method of reproducing the image.

The display may include a first display unit and a second display unit, and the controller may obtain the aspect ratio information of the display using aspect ratio information of the first display unit and aspect ratio information of the second display unit, and determine the angle of view of the 360 degree image to be displayed on the display on the basis of the obtained aspect ratio information of the display.

The display may include a first display unit and a second display unit, and the controller may obtain the type and curvature information of the display using a type and curvature information of the first display unit and a type and curvature information of the second display unit, and determine the angle of view of the 360 degree image to be displayed on the display on the basis of the obtained type and curvature information of the display.

The controller may determine the angle of view of the 360 degree image to be displayed on the display on the basis of a lookup table storing the aspect ratio information of the display and an angle of view which matches the aspect ratio information.

The controller may determine the angle of view of the 360 degree image to be displayed on the display on the basis of a lookup table storing the aspect ratio information and curvature information of the display, and an angle of view which matches the aspect ratio information and curvature information.

The electronic apparatus may further include a camera, and the controller may display the 360 degree image on the display using an image signal input through the camera.

The electronic apparatus may further include a storage, and the controller may display the 360 degree image on the display using 360 degree image data which is pre-stored in the storage.

According to an aspect of another embodiment, a method of operating an electronic apparatus includes identifying at least one of aspect ratio information of a display of the electronic apparatus, a type of the display, and curvature information of the display, determining an angle of view of a 360 degree image to be displayed on the display on the basis of at least one of the identified aspect ratio information of the display, type of the display, and curvature information of the display, and displaying a region of the 360 degree image according to the determined angle of view.

According to an aspect of still another embodiment, a non-transitory computer-readable recording medium in which instructions for performing a method of operating an electronic apparatus including a display are stored, wherein the method of operating the electronic apparatus includes identifying at least one of aspect ratio information of a display of the electronic apparatus, a type of the display, and curvature information of the display, determining an angle of view of a 360 degree image to be displayed on the display on the basis of at least one of the identified aspect ratio information of the display, type of the display, and curvature information of the display, and displaying the 360 degree image according to the determined angle of view.

According to an aspect of still another embodiment, an electronic apparatus comprises a display, and a controller electrically connected to the display. The controller is configured to control the display, and the controller is configured to identify at least one of aspect ratio information of the display, or curvature information of the display, determine a vertical angle of view of a 360 degree image and a horizontal angle of view of the 360 degree image to be displayed on the display on a basis of at least one of the aspect ratio information of the display, or the curvature information of the display, and control the display to display a region of the 360 degree image according to the determined vertical angle of view and the determined horizontal angle of view.

BRIEF DESCRIPTION OF THE DRAWINGS

These and/or other aspects will become apparent and more readily appreciated from the following description of the embodiments, taken in conjunction with the accompanying drawings in which:

FIG. 1 illustrates views for describing a situation in which an electronic apparatus according to various embodiments displays a 360 degree image;

FIG. 12 is a view for describing a situation in which an image is displayed by combining a plurality of curved displays in the electronic apparatus according to various embodiments.

DETAILED DESCRIPTION

Figure 2:
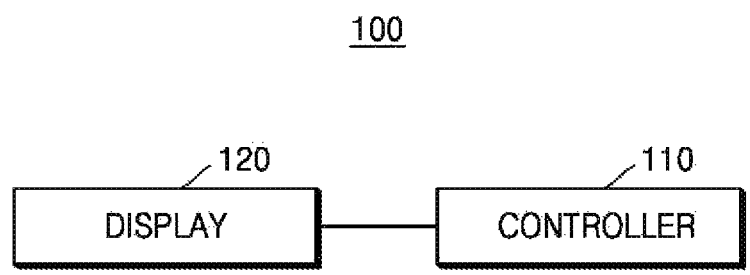
FIG. 2 is a block diagram illustrating a schematic configuration of the electronic apparatus according to various embodiments of the present disclosure.

Reference will now be made in detail to certain exemplary embodiments, which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are described below, by referring to the figures, to explain aspects. As used herein, the term "and/or" includes any and all combinations of one or more of the associated listed item. Expressions such as "at least one of," when preceding a list of elements, modify the entire list of elements and do not modify the individual elements of the list.

Hereinafter, various exemplary embodiments in this specification will be described with reference to the accompanying drawings. It should be understood that the embodiments and terminology used herein are not intended to limit the techniques described herein to specific exemplary embodiments, but rather to cover various modifications, equivalents, and/or alternatives of the exemplary embodiments. Like reference numerals in the drawings may denote like elements. As used here, the singular forms "a" and "an" may include plural forms as well unless the context clearly indicates otherwise. In this specification, the terms "A or B" or "at least one of A and/or B" may include all possible combinations of elements listed together. The terms "first," "second," and the like may represent the corresponding element regardless of order or importance thereof, and are used to distinguish one element from another and do not limit the corresponding element. When an element (e.g., a first element) is referred to as being "functionally or communicatively connected" or "coupled" to another element (e.g., a second element), it may be directly connected or coupled to the other element or connected through another element (e.g., a third element).

In this specification, the term an element "configured to (or set to)" may be interchangeably used with, for example, an element "which is appropriate in hardware or software," an element "having an ability to," an element "which is changed to," an element "which is made to," an element "capable of," or an element "which is designed to" according to a situation. In some cases, the term an "apparatus configured to" may mean that the apparatus may operate with other apparatuses or parts. For example, the term a "processor configured (or set) to perform A, B, and C" may refer to a dedicated processor (e.g., an embedded processor) capable of performing the corresponding operation, or a general-purpose processor (e.g., a central processing unit (CPU) or an application processor) capable of performing the corresponding operation by performing one or more software programs stored in a memory device.

Electronic apparatuses according to the various exemplary embodiments in this specification may include, for example, at least one of a smart phone, a tablet PC, a mobile phone, a video phone, an electronic book reader, a desktop PC, a laptop PC, a netbook computer, a workstation, a server, a personal digital assistant (PDA), a portable multimedia player (PMP), an MPEG-1 or MPEG-2 Audio Layer III (MP3) player, a medical device, a camera, and a wearable device. The wearable device may include at least one of a portable device (e.g., a watch, a ring, a bracelet, an ankle bracelet, a necklace, glasses, a contact lens, or a head-mounted display (HMD) device), a textile or garment integrated device (e.g., electronic clothing), a body attachable type (e.g., a skin pad or a tattoo), or a living body implantable circuit. In some embodiments, the electronic apparatus may include, for example, at least one of a television, a digital video disk (DVD) player, an audio device, a refrigerator, an air conditioner, a vacuum cleaner, an oven, a microwave oven, a washing machine, an air purifier, a set-top box, a home automation control panel, a security control panel, a media box (e.g., a Samsung HomeSync™, an Apple TV™, or a Google TV™), a game console (e.g., an Xbox™ or a PlayStation™), an electronic dictionary, an electronic key, a camcorder, and a digital photo frame.

In other embodiments, the electronic apparatus may include at least one of various medical devices. Examples of such medical devices include various portable medical measuring devices, such as a blood glucose meter, a heart rate meter, a blood pressure meter, a body temperature meter, and the like, a magnetic resonance angiography (MRA) device, a magnetic resonance imaging (MRI) device, a computed tomography (CT) device, an imaging device, an ultrasonic device, etc.).

The electronic apparatus may also include at least one of the following types of various electronic devices, such as a navigator, a global navigation satellite system (GNSS), an event data recorder (EDR), a flight data recorder (FDR), an automobile infotainment device, a marine electronic device (e.g., a marine navigation device, a gyro compass, etc.), an avionic device, a security device, a head unit for a vehicle, an industrial or household robot or drone, an automated teller machine (ATM) of a financial institution, a point of sales (POS) of a store, and Internet of things (IoT) devices (e.g., light bulbs, various sensors, sprinkler devices, fire alarms, thermostats, street lights, toasters, exercise equipment, hot water tanks, heaters, boilers, etc.).

According to some embodiments, the electronic apparatus may include at least one of a part of furniture, a building, a structure, or an automobile, an electronic board, an electronic signature receiving device, a projector, and various measuring devices (e.g., water, electricity, gas, or electromagnetic wave measuring devices, etc.). In various embodiments, the electronic apparatus may be flexible or may be a combination of two or more of the various apparatuses described above.

The electronic apparatus according to the embodiment in this specification is not limited to the above-described devices. In this specification, the term a "user" may refer to a person who uses an electronic apparatus or an apparatus (e.g., an artificial intelligence electronic apparatus) which uses the electronic apparatus.

FIG. 1 illustrates views for describing a situation in which an electronic apparatus according to various embodiments displays a 360 degree image.

Referring to FIG. 1, an electronic apparatus 100 according to various embodiments may display a 360 degree image. According to various embodiments, the 360 degree image may be an image having a 360 degree angle of view. For example, the 360 degree image may be an image generated based on a plurality of images which are captured in a 360 degree direction using at least one camera. In this case, the plurality of captured images may be mapped to a sphere, and contact points of the mapped images may be connected (stitched) to each other so that a spherical 360 degree image may be generated. Further, the spherical 360 degree image may be converted into a two-dimensional (2D) 360 degree image 10 as illustrated in FIG. 1 in order to be transmitted to or stored in another device.

The electronic apparatus 100 according to various embodiments may convert the 2D 360 degree image 10 into a spherical 360 degree image 20 by performing graphic processing on the 2D 360 degree image 10. For example, the electronic apparatus 100 may map a 2D 360 degree image to a sphere to generate the spherical 360 degree image 20.

The electronic apparatus 100 may select a region 25 of the spherical 360 degree image 20 and display an image corresponding to the selected region 25 on a display. In this case, the electronic apparatus 100 may perform image quality processing on the image corresponding to the selected region 25 to display the image quality processed image on the display. Also, the electronic apparatus 100 may scale and display an image according to the resolution of the display.

The electronic apparatus 100 according to various embodiments may be a TV, but this is only one embodiment, and the electronic apparatus 100 may be implemented with a variety of electronic apparatuses that include a display. For example, as described above, the electronic apparatus 100 may be implemented with various electronic apparatuses such as smart phones, tablet PC's, digital cameras, desktop computers, electronic-book terminals, digital broadcasting terminals, wearable devices, and the like.

Specifically, the electronic apparatus 100 according to various embodiments of the present disclosure may be easily implemented as a display device having a large display such as a TV, but the present disclosure is not limited thereto. Further, the electronic apparatus 100 may be a stationary apparatus, or portable type of apparatus, and the electronic apparatus 100 may be a digital broadcasting receiver with at least one antenna capable of receiving digital broadcasting.

The electronic apparatus 100 may be implemented as a flat display device, a curved display device which is a screen having a curvature, or a flexible display device having an adjustable curvature. The electronic apparatus 100 may have, for example, high definition (HD) resolution, full HD resolution, ultra HD resolution, or a higher resolution output than the ultra HD resolution.

According to various embodiments, the electronic apparatus 100 may be integrated with a display, and may be configured separately from the display to display an image on the display through wired or wireless communication.

According to various embodiments, the electronic apparatus 100 may be controlled by a controller, and the controller may be implemented as various types of devices, such as a remote controller, a smart phone, a microprocessor, a system on a chip, or a central processing unit (CPU), or the like, for controlling the electronic apparatus 100. The controller may also include a memory, RAM, or ROM.

Further, the controller may control the electronic apparatus 100 using short-range communication including Infrared Data Association (IrDA), Bluetooth, or another type of short-range communication such as Bluetooth. The controller may control a function of the electronic apparatus 100 using at least one of a provided key (including a button), a touch pad, a microphone (not illustrated) capable of receiving sound signals such as a user's voice, and a motion sensor (not illustrated) capable of recognizing a motion of the controller. The motion sensor may be implemented with an infrared sensor, a microwave sensor, an ultrasound sensor, or a camera.

According to various embodiments, an image reproduced by the electronic apparatus 100 is not limited to the 360 degree image. For example, the electronic apparatus 100 may reproduce a panoramic image. The panoramic image may be, for example, an image generated based on a plurality of images which are captured while changing a capturing direction using at least one camera. The panoramic image may be generated using a method similar to the 360 degree image described above, but may have various capturing angles of view such as 30 degrees, 90 degrees, 180 degrees, and the like. Furthermore, the electronic apparatus 100 may reproduce a 2D image having a fixed capturing angle of view. Hereinafter, description will be made assuming a case in which the electronic apparatus 100 reproduces a 360 degree image.

FIG. 2 is a block diagram illustrating a schematic configuration of the electronic apparatus according to various embodiments of the present disclosure.

Referring to FIG. 2, the electronic apparatus 100 according to various embodiments may include a controller 110 and a display 120. The configuration illustrated in FIG. 2 is not essential, and the electronic apparatus 100 according to various embodiments may be implemented to have more or fewer components than those illustrated in FIG. 2.

According to various embodiments, the controller 110 may process an image signal to input the image signal to the display 120. Accordingly, an image corresponding to the corresponding image signal may be displayed on the display 120. Further, the controller 110 may control the electronic apparatus 100 through a user command or an internal program.

According to various embodiments, the controller 110 may identify an image which will be displayed on the display 120 and characteristic information of the display 120. The characteristic information may include, for example, an aspect ratio of the display 120, and a type and curvature information of the display 120. The aspect ratio may be, for example, a ratio of a horizontal length of the display 120 to a vertical length thereof. The type of display may indicate whether the display is flat or curved. The type of the display 120 may comprise, for example, a flat display, a curved display, or a flexible display having an adjustable curvature.

The controller 110 may determine a display range of an image which will be displayed on the display 120 on the basis of the characteristic information of the display 120.

According to various embodiments, the display 120 generates a driving signal by converting an image signal, a data signal, an on-screen display (OSD) signal, a control signal, and the like, which are processed by the controller 110. The display 120 may be implemented as a plasma display panel (PDP), a liquid-crystal display (LCD), an organic light-emitting diode (OLED) display, a flexible display, or a three-dimensional (3D) display. Further, the display 120 may be used as an input device in addition to an output device by including a touch screen. If the display 120 is to be used as an input device, the display may include a touchscreen display that permits a user to interact with the device by touching areas of the display.

According to various embodiments, the display 120 may be a combination of a plurality of displays. For example, the display 120 may include a first display and a second display, or even a third display.

The display 120 according to various embodiments may display an image corresponding to a region of the 360 degree image, and the image displayed on the display 120 may be an image quality processed 360 degree image.

Figure 3:
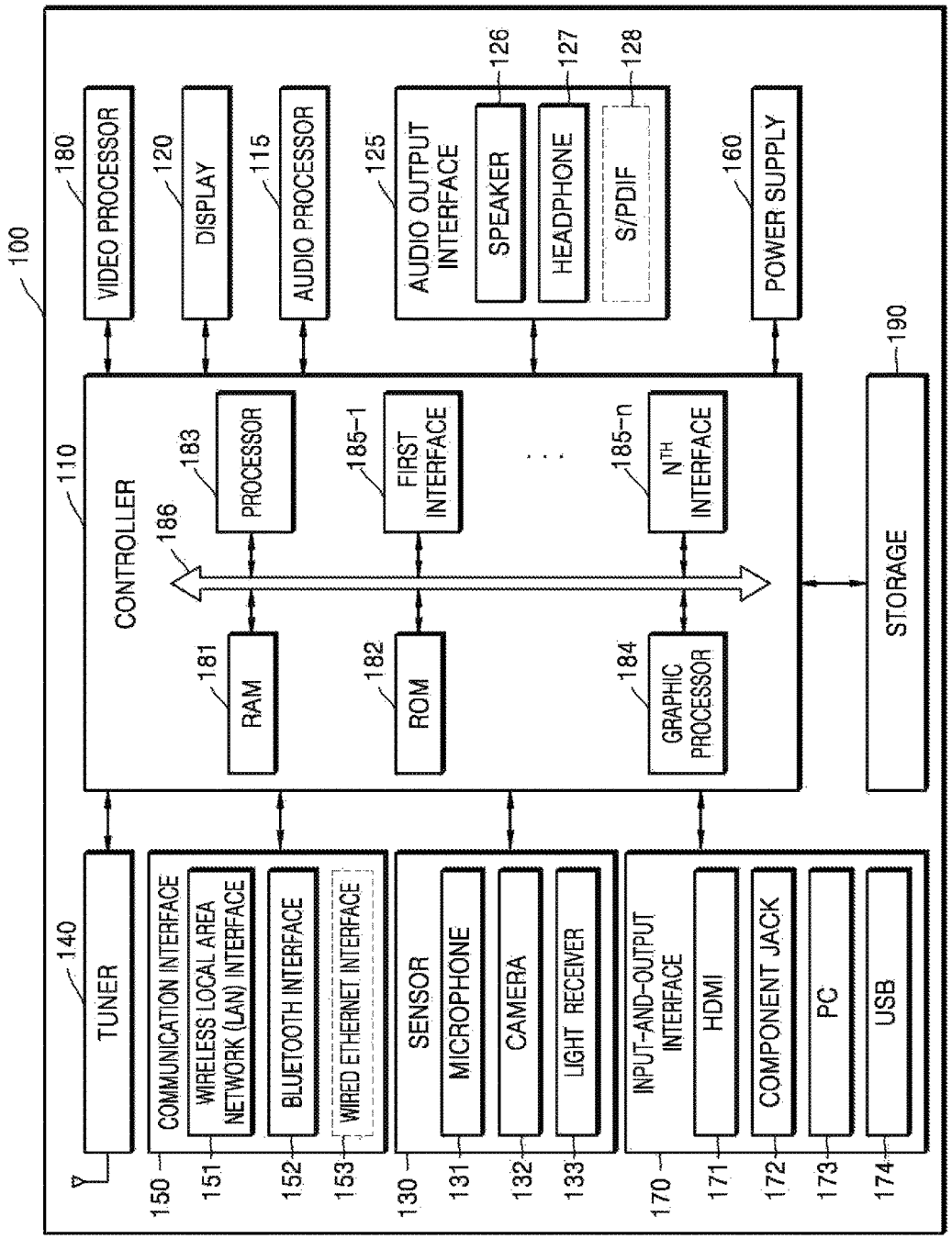
FIG. 3 is a block diagram illustrating a configuration of the electronic apparatus according to various embodiments.

FIG. 3 is a block diagram illustrating a configuration of the electronic apparatus according to various embodiments.

Referring to FIG. 3, the electronic apparatus 100 according to various embodiments may further include a video processor 180, an audio processor 115, an audio output interface 125, a power supply 160, a tuner 140, a communication interface 150, an input-and-output interface 170, and a storage 190 in addition to the controller 110, the display 120, and a sensor 130.

The display 120 may display a video included in a broadcasting signal, which is received through the tuner 140, on a screen by the control of the controller 110. Further, the display 120 may display content (e.g., a video) which is input through the communication interface 150 or the input-and-output interface 170. The display 120 may output an image stored in the storage 190 by the control of the controller 110. Furthermore, the display 120 may display a voice user interface (UI) (e.g., including a voice command guide) for performing a voice recognition task corresponding to voice recognition. The voice user interface could be implemented via an on-screen display that guides a user to speak certain phrases in order to control the electronic apparatus 100. The display 120 may also include a motion UI (e.g., including a user motion guide for motion recognition) for performing a motion recognition task corresponding to motion recognition. The motion UI could be implemented via an on-screen display that guides a user to perform certain gestures in order to control the electronic apparatus 100.

The audio processor 115 performs signal processing on audio data. In the audio processor 115, various processing functions such as decoding, amplification, noise filtering, and the like may be performed on the audio data. Meanwhile, the audio processor 115 may include a plurality of audio processing modules to perform processing on audio corresponding to audio content.

The audio output interface 125 outputs audio included in the broadcasting signal which is received through the tuner 140 by the control of the controller 110. The audio output interface 125 may output audio (e.g., voice or sound) which is input through the communication interface 150 or the input-and-output interface 170. Further, the audio output interface 125 may output audio stored in the storage 190 by the control of the controller 110. The audio output interface 125 may include at least one of a speaker 126, a headphone output terminal 127, and a Sony/Philips Digital Interface Format (S/PDIF) output terminal 128. The audio output interface 125 may include a combination of the speaker 126, the headphone output terminal 127, and the S/PDIF output terminal 128. The audio output interface 125 may also include a plurality of speakers.

The power supply 160 supplies power, which is input from an external power source, to internal components of the electronic apparatus 100 by the control of the controller 110. Further, the power supply 160 may supply power, which is output from one or more batteries (not illustrated) located in the electronic apparatus 100, to the internal components by the control of the controller 110.

The tuner 140 may tune and select a frequency of a channel to be received by the electronic apparatus 100 among many radio wave components by performing amplification, mixing, and resonance on a broadcasting signal which is received in a wired or wireless manner. The broadcasting signal includes audio, video, and additional information (e.g., an electronic program guide (EPG)). The tuner 140 may include at least one antenna.

The tuner 140 may receive a broadcasting signal in a frequency band corresponding to a channel number (e.g., a cable broadcasting channel number 506) according to a user input (e.g., a control signal which is received from the controller 110, such as a channel number input, an up-down input of a channel, and a channel input in an EPG screen).

The tuner 140 may receive a broadcasting signal from various sources such as terrestrial broadcasting, cable broadcasting, satellite broadcasting, Internet broadcasting, and the like. The tuner 140 may receive the broadcasting signal from sources such as analog broadcasting and digital broadcasting. The broadcasting signal received through the tuner 140 is decoded (e.g., audio decoding, video decoding, or additional information decoding) and divided into audio, video, and/or additional information. The divided audio, video, and/or additional information may be stored in the storage 190 by the control of the controller 110.

The tuner 140 of the electronic apparatus 100 may comprise one or more tuners. The tuner 140 may be implemented as all-in-one to be integral with the electronic apparatus 100. Alternatively, the tuner 140 may be implemented as a separate device (e.g., a set-top box (not illustrated) or a tuner (not illustrated) connected to the input-and-output interface 170) which is in turn connected to the electronic apparatus 100.

The communication interface 150 may connect the electronic apparatus 100 to an external device (e.g., an audio device and the like) by the control of the controller 110. The controller may transmit and receive contents to and from an external device connected through the communication interface 150, download applications from the external device, or browse the web. The communication interface 150 may include one of a wireless local area network (LAN) interface 151, a Bluetooth interface 152, and an Ethernet interface 153 according to the performance and structure of the electronic apparatus 100. Further, the communication interface 150 may include a combination of the wireless LAN interface 151, the Bluetooth interface 152, and the Ethernet interface 153. The communication interface 150 may receive a control signal of the controller 110 by the control of the controller 110. The control signal may be implemented as a Bluetooth type signal, a radio frequency (RF) signal, or a WiFi type signal.

The communication interface 150 may further include other short-distance communication schemes (e.g., near field communication (NFC, not illustrated) and Bluetooth low energy (BLE, not illustrated)) other than Bluetooth.

The sensor 130 may sense a user's voice, a user's image, or a user's interaction, and the sensor may include at least one of a microphone 131, a camera 132, and a light receiver or light-sensitive sensor 133.

The microphone 131 receives a user's spoken voice commands and other sound signals. The microphone 131 may convert the received spoken voice command into an electrical signal and output the electrical signal to the controller 110. The user's voice command may include, for example, voice command corresponding to a menu or function of the electronic apparatus 100.

The camera 132 may receive an image (e.g., a continuous frame) that includes information on the user's motion such as a gesture made by the user within a camera recognition range.

The electronic apparatus may store a library of predetermined gestures in the storage 190. The controller 110 may then analyze the received image to compare the receive image to the predetermined gestures stored in the storage, and determine whether a user has performed a predetermined gesture.

The controller 110 may then select a menu and control the display to display the menu on the electronic apparatus 100 using a recognition result of the received user-generated motion or gesture, and perform control corresponding to the motion recognition result or gesture. For example, the control corresponding to the motion recognition result may include channel adjustment, volume adjustment, indicator movement, and cursor movement. In other words, a user can control channel adjustment, volume adjustment, indicator movement, and cursor movement by performing certain gestures that are recognized as corresponding to predetermined gestures.

According to various embodiments, the controller 110 may determine an image, which will be displayed on the display 120, using an image signal which is input through the camera 132.

The light receiver 133 receives an optical signal (including a control signal), which is received from an external controller, through a light receiving window (not illustrated) of a bezel of the display 120. The light receiver 133 may receive an optical signal corresponding to the user's input (e.g., touch, press, touch gesture, voice, or motion) from the controller 110. A control signal may be extracted from the received optical signal by the control of the controller 110.

The input-and-output interface 170 receives a video (e.g., a moving picture and the like), an audio (e.g., voice, music, and the like), and additional information (e.g., EPG and the like) from the outside of the electronic apparatus 100 by the control of the controller 110. The input-and-output interface 170 may include at least one of a high-definition multimedia interface (HDMI) port 171, a component jack 172, a PC port 173, and a Universal Serial Bus (USB) port 174. The input-and-output interface 170 may include a combination of the HDMI port 171, the component jack 172, the PC port 173, and the USB port 174.

The controller 110 controls the overall operation of the electronic apparatus 100 and the signal flow between the internal components of the electronic apparatus 100, and performs a data processing function. When there is a user input or a preset and stored condition is satisfied, the controller 110 may execute an operating system (OS) and various applications, which are stored in the storage 190.

According to various embodiments, the controller 110 may identify aspect ratio information of the display 120 (e.g., 16:9 or 4:3), and determine a display range of an image which will be displayed on the display 120 among images which will be displayed on the display 120 on the basis of the identified aspect ratio information of the display 120.

The controller 110 may identify a type and curvature information of the display 120, and determine a display range of an image which will be displayed on the display 120 among the images on the basis of the type and/or curvature information of the display 120.

The controller 110 may determine an image reproducing method on the basis of the determined display range and the type and curvature information of the display 120, and display the determined display range on the display 120 using the image reproducing method.

According to various embodiments, when the display 120 includes a first display unit and a second display unit, the controller 110 may obtain aspect ratio information of the display 120 using aspect ratio information of the first display unit and aspect ratio information of the second display unit, and determine a display range of an image which will be displayed on the display 120 among the images on the basis of the obtained aspect ratio information of the first display unit and the second display unit of the display 120.

According to various embodiments, when the display 120 includes a first display unit and a second display unit, the controller 110 may obtain a type and curvature information of the display 120 using a type and curvature information of the first display unit and a type and curvature information of the second display unit, and determine a display range of an image which will be displayed on the display 120 among the images on the basis of the obtained type and curvature information of the first display unit and the second display unit of the display 120.

According to various embodiments, the controller 110 may determine a display range of an image which will be displayed on the display 120 among the images on the basis of a lookup table, in which the aspect ratio information of the display 120 and the display range which matches the aspect ratio information are stored.

According to various embodiments, the controller 110 may determine a display range of an image which will be displayed on the display 120 among the images on the basis of a lookup table, in which the aspect ratio information and curvature information of the display 120 and the display range which matches the aspect ratio information and curvature information are stored.

According to various embodiments, when the electronic apparatus 100 further includes the camera 132, the controller 110 may display an image on the display 120 using an image signal or data which is generated by the camera 132.

According to various embodiments, when the electronic apparatus 100 further includes the storage 190, the controller 110 may display an image on the display 120 using image data which is pre-stored in the storage 190.

A processor 183 may include a graphic processing unit (GPU, not illustrated) for processing graphics corresponding to video. The processor 183 may be implemented as a system on chip (SoC) in which a core processor (not illustrated) is integrated with a GPU (not illustrated). The processor 183 may include a single-core processor, a dual-core processor, a triple-core processor, a quad-core processor, or other multi-core processors.

Further, the processor 183 may include a plurality of processors. For example, the processor 183 may be implemented as a main processor (not illustrated) and a sub processor (not illustrated) which operates in a sleep mode or low energy mode.

First to $n^{th}$ interfaces 185-1 to 185-$n$ are connected to the various components described above. One of the interfaces may be a network interface which is connected to an external device through a network.

A RAM 181, a ROM 182, the processor 183, a graphic processor 184, and the first to $n^{th}$ interfaces 185-1 to 185-$n$ may be connected to each other through an internal bus 186.

In the present embodiment, the term a "controller of an electronic apparatus" includes the processor 183, the ROM 182, and the RAM 181.

The storage 190 may store various pieces of data, programs, or applications for driving and controlling the electronic apparatus 100 by the control of the controller 110. The storage 190 may store input and output signals or data corresponding to the driving of the video processor 180, the display 120, the audio processor 115, the audio output interface 125, the power supply 160, the tuner 140, the communication interface 150, the sensor 130, and the input-and-output interface 170. The storage 190 may store control programs for controlling the electronic apparatus 100 and the controller 110, applications which are originally provided by the manufacturer or downloaded from an external source, a graphical user interface (GUI) related to the applications, an object for providing the GUI (e.g., image text, an icon, a button, and the like), user information, documents, databases, or related data.

In one embodiment, the term a "storage" includes the storage 190, the ROM 182 and the RAM 181 of the controller 110, or a memory card mounted in the electronic apparatus 100 (e.g., a micro secure digital (SD) card or an USB memory, not illustrated). Further, the storage 190 may include a non-volatile memory, a volatile memory, a hard disk drive (HDD), or a solid state drive (SSD).

Further, the electronic apparatus 100 having the display 120 may be electrically connected to a separate external device having a tuner (e.g., a set-top box; not illustrated). For example, the electronic apparatus 100 may be implemented as an analog TV, a digital TV, a 3D TV, a smart TV, a light-emitting diode (LED) TV, an OLED TV, a plasma TV, a monitor, or the like, but it will be easily understood by those skilled in the art that the present disclosure is not limited thereto.

Meanwhile, the block diagrams of the electronic apparatus 100 illustrated in FIGS. 2 and 3 are block diagrams for one embodiment. The components in the block diagrams may be integrated, added, or omitted according to specifications of the actually implemented electronic apparatus 100. That is, two or more components may be combined into one component, or one component may be divided into two or more components as necessary. Further, functions performed in each block are intended to describe embodiments, and specific operations or devices do not limit the scope of the present disclosure.

Figure 4:
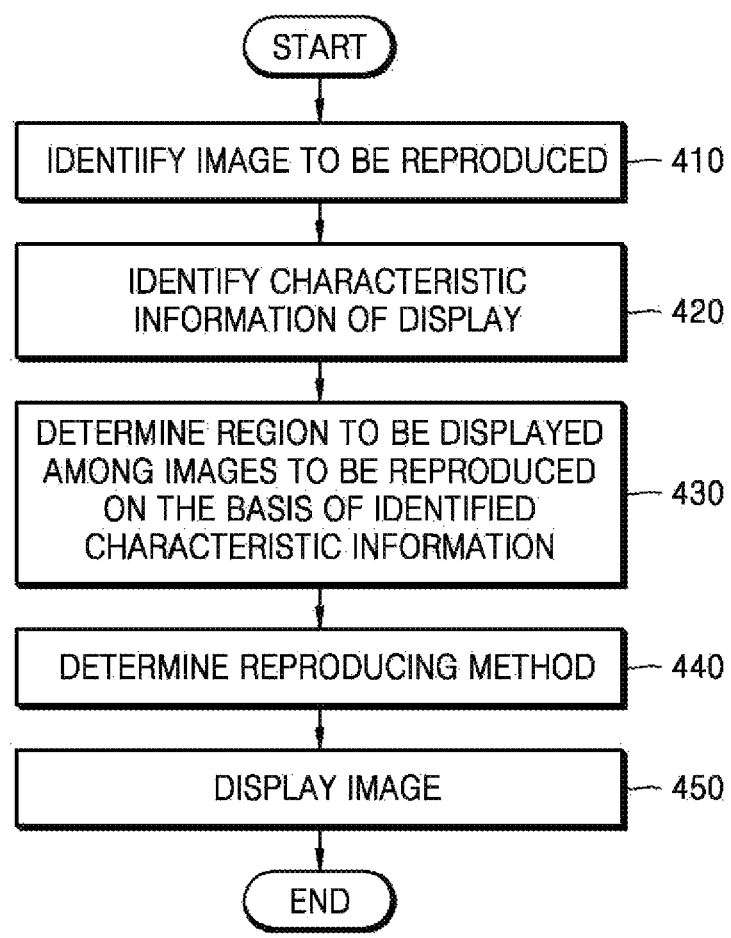
FIG. 4 is a flowchart for describing a method of displaying an image in the electronic apparatus according to various embodiments.

FIG. 4 is a flowchart for describing a method of displaying an image in the electronic apparatus according to various embodiments.

Referring to operation 410, the electronic apparatus 100 may identify an image which will be reproduced. A method of identifying an image which will be reproduced by the electronic apparatus 100 may vary. For example, the electronic apparatus 100 may identify an image which will be reproduced based on a user's input among images stored in the storage 190.

According to various embodiments, the electronic apparatus 100 may determine at least one frame among images which are input through the camera 132 to be an image which will be reproduced. For example, the electronic apparatus 100 may determine an image signal, which is input through a lens (not illustrated) included in the camera 132 and is processed through an image sensor (not illustrated), as an image which will be reproduced. In this case, the camera 132 may continuously generate the image signal, and thus the image which will be reproduced by the electronic apparatus 100 may be continuously changed.

Referring to operation 420, the electronic apparatus 100 may identify the characteristic information of the display 120 included in the electronic apparatus 100. According to various embodiments, the display 120 may be a part of the electronic apparatus 100. However, the present disclosure is not limited thereto. For example, the display 120 may be a device separated from the electronic apparatus 100. The display 120 may communicate with the electronic apparatus 100 via wired or wireless communication to receive and display an image.

According to various embodiments, the display 120 may include a plurality of display units. For example, one display 120 may be completed by combining four display units. In this case, the display 120 may reproduce a single image, and the display units may reproduce different images. Further, in another embodiment, the display 120 may refer to a set of a plurality of displays connected to the electronic apparatus 100.

According to various embodiments, the characteristic information of the display 120 may include, for example, an aspect ratio of the display 120 and a type and curvature information of the display 120. The aspect ratio may be, for example, a ratio of a horizontal length of the display 120 to a vertical length thereof. The display 120 may include, for example, a flat display, a curved display, and a flexible display having an adjustable curvature.

According to various embodiments, when the electronic apparatus 100 does not include a display 120 and instead includes a projector rather than a display, the characteristic information of the display 120 may include an aspect ratio of an output image and a type and curvature information of the output image, which may be adjusted by the projector.

A more detailed process of confirming the characteristic information of the display 120 will be described with reference to FIGS. 5 and 6A.

Figure 5:
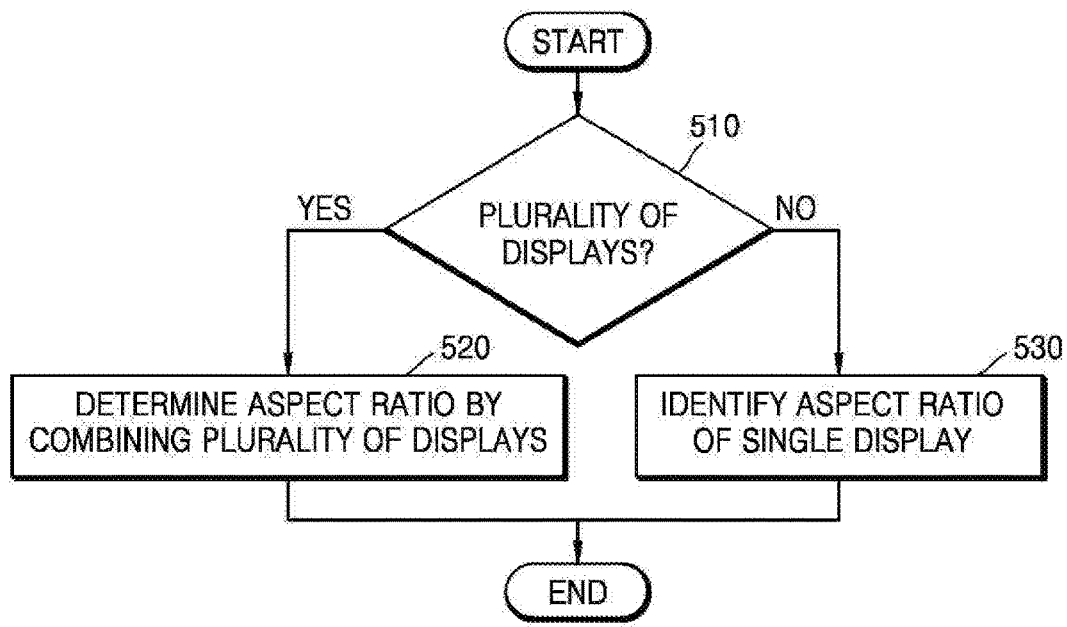
FIG. 5 is a flowchart for describing a process of identifying an aspect ratio of a display in the electronic apparatus according to various embodiments.

Referring to FIG. 5, the electronic apparatus 100 may identify an aspect ratio of the display 120.

Referring to operation 510, the electronic apparatus 100 may determine whether the number of display units constituting the display 120 is more than one, or the number of displays connected to the electronic apparatus is more than one. As described above, the display 120 may be mounted on the electronic apparatus 100, or may be separately configured and electrically connected to the electronic apparatus 100. Further, the electronic apparatus 100 includes the display 120, and may also be electrically connected to an external display. Therefore, the electronic apparatus 100 may identify the number of all displays which are electrically connected thereto. Hereinafter, in FIGS. 5 and 6A, description will be made assuming a case in which a set of a plurality of displays constitutes the display 120.

Referring to operation 520, when the number of displays connected to the electronic apparatus 100 is more than one, the electronic apparatus 100 may combine the plurality of displays to determine an aspect ratio of the combination of displays. For example, the electronic apparatus 100 may identify a horizontal length of a first display and a vertical length thereof, and identify a horizontal length of a second display and a vertical length thereof.

According to various embodiments, the horizontal length and vertical length of the first display may be identified in a memory of the first display. In the same way, the horizontal length and vertical length of the second display may be identified in a memory of the second display.

The electronic apparatus 100 may add the horizontal length of the first display to the horizontal length of the second display, and add the vertical length of the first display to the vertical length of the second display. Also, the electronic apparatus 100 may calculate a ratio of a horizontal length of the display 120 to a vertical length thereof using the calculated horizontal and vertical lengths.

According to various embodiments, when the first display and the second display are combined and arranged, the display 120 including the first display and the second display may have a curvature that depends on how the displays are arranged with respect to one another. In this case, the electronic apparatus 100 may calculate the curvature of the display 120 using a process of FIG. 6A to be described below.

According to various embodiments, when the electronic apparatus 100 is a projector, an aspect ratio thereof may vary by the user's adjustment. In this case, the electronic apparatus 100 may obtain the aspect ratio using a user's adjustment value of the projector.

Referring to operation 530, when there is a single display 120, the electronic apparatus 100 may identify an aspect ratio thereof by identifying a horizontal length of the display 120 and a vertical length thereof in a memory of the display 120.

Figure 6A:
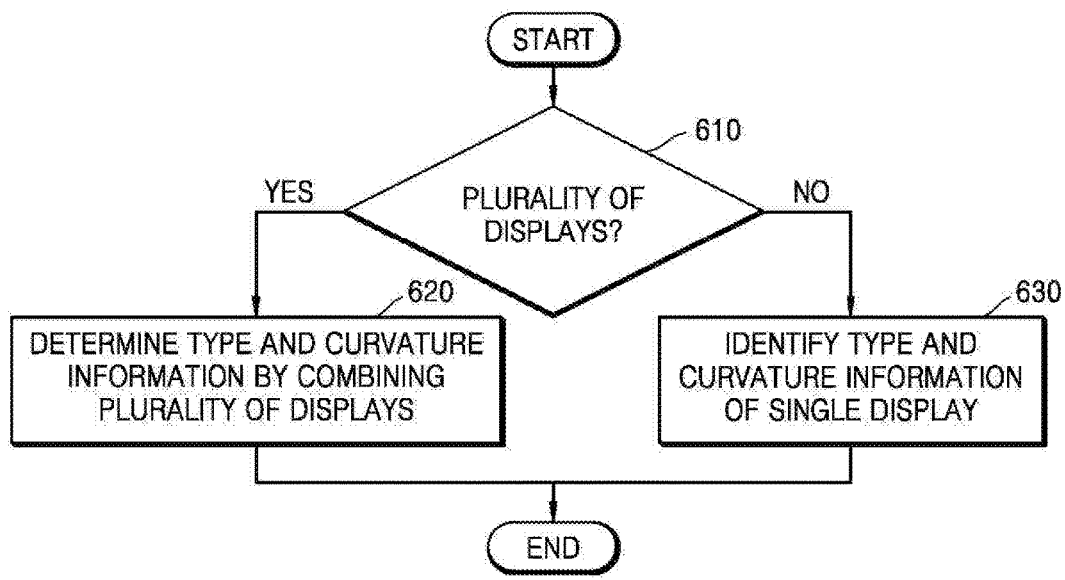
FIG. 6A is a flowchart for describing a process of identifying a type and curvature information of the display in the electronic apparatus according to various embodiments.

Referring to FIG. 6A, the electronic apparatus 100 may identify a type and curvature information of the display 120.

Referring to operation 610, the electronic apparatus 100 may determine whether the number of displays 120 is more than one. The electronic apparatus 100 may identify the number of all displays which are electrically connected to the electronic apparatus 100.

Referring to operation 620, when the number of displays 120 is more than one, the electronic apparatus 100 may determine a type and curvature information of the displays 120 by combining the plurality of displays. For example, the electronic apparatus 100 may identify a type and curvature information of a first display and a type and curvature information of a second display.

According to various embodiments, the type and curvature information of the first display may be identified in a memory of the first display. In the same way, the type and curvature information of the second display may be identified in a memory of the second display.

The electronic apparatus 100 may calculate curvature information of the display 120 by combining the curvature information of the first display with the curvature information of the second display to produce a unified curvature model of the first and second displays.

Referring to operation 630, when there is a single display 120, the electronic apparatus 100 may identify the type and curvature information of the display 120 in a memory of the display 120.

According to various embodiments, a curvature of the display 120 in a horizontal direction may be different from a curvature of the display 120 in a vertical direction according to a type of the display 120. For example, when the display 120 is cylindrical or elliptical, the display 120 may have different curvatures in the horizontal direction and the vertical direction. In this case, the electronic apparatus 100 may identify each piece of curvature information separately.

Referring again to FIG. 4, in operation 430, the electronic apparatus 100 may determine a region which will be displayed (or an angle of view) among images which will be reproduced on the basis of the identified aspect ratio information of the display and the identified type and curvature information of the display.

According to various embodiments, the electronic apparatus 100 may determine a horizontal direction display region and a vertical direction display region in consideration of the aspect ratio and curvature of the display 120. For example, when the display 120 is flat, the electronic apparatus 100 may derive a display region using a relational expression between a predefined aspect ratio and display region. Further, the electronic apparatus 100 may determine the horizontal direction display region and the vertical direction display region using, for example, a table as illustrated in Table 1. The unit of the angle of view is a degree.

TABLE 1

| Aspect Ratio (Width:Height) | Horizontal Angle of View | Vertical Angle of View |
|---|---|---|
| 1:1 | 100 | 100 |
| 4:3 | 124 | 100 |
| 16:9 | 155 | 100 |
| 2:1 | 158 | 98 |
| 21:9 | 160 | 92 |
| 3:1 | 160 | 65 |
| 3:4 | 110 | 137 |
| 9:16 | 110 | 162 |

According to various embodiments, when the display 120 is curved, the electronic apparatus 100 may derive a display region using a relational expression, which derives a display region using a predefined aspect ratio and curvature. Further, the electronic apparatus 100 may determine the horizontal direction display region and the vertical direction display region using, for example, a table as illustrated in Table 2.

TABLE 2

| Aspect Ratio (Width:Height) | Curvature | | | | | |
|---|---|---|---|---|---|---|
| | 1800R | | 3000R | | 4200R | |
| | Horizontal Angle of View | Vertical Angle of View | Horizontal Angle of View | Vertical Angle of View | Horizontal Angle of View | Vertical Angle of View |
| 1:1 | 100 | 100 | 100 | 100 | 100 | 100 |
| 4:3 | 133 | 100 | 130 | 100 | 130 | 100 |
| 16:9 | 177 | 100 | 164 | 100 | 161 | 100 |
| 2:1 | 200 | 100 | 171 | 98 | 163 | 98 |
| 21:9 | 233 | 100 | 173 | 96 | 165 | 92 |
| 3:1 | 300 | 100 | 173 | 75 | 165 | 65 |
| 3:4 | 100 | 133 | 113 | 136 | 115 | 137 |
| 9:16 | 100 | 177 | 113 | 170 | 115 | 162 |

According to various embodiments, when the electronic apparatus 100 derives a display region, the electronic apparatus 100 may determine the display region within a range of a preset reference value. For example, the electronic apparatus 100 may determine the narrowest angle of view within a range in which the quality of an image which will be reproduced may be maintained at a constant level. Further, the electronic apparatus 100 may determine the widest angle of view within a range in which distortion of an image which will be reproduced may be minimized.

Referring to operation 440, the electronic apparatus 100 may determine a method of reproducing an image according to an angle of view and a curvature. According to various embodiments, the electronic apparatus 100 may determine a method of reproducing an image according to an aspect ratio and an angle of view in consideration of a ratio of objects included in an image which will be displayed and the distortion of the image.

The electronic apparatus 100 may determine a method of reproducing an image according to an aspect ratio and an angle of view based on, for example, tables as illustrated in Table 3 and/or 4. For example, the electronic apparatus 100 may use a reproducing method such as a rectilinear projection reproducing method, a Pannini projection reproducing method, a stereographic projection reproducing method, and the like. The electronic apparatus 100 may display an image using Table 3 when the display 120 is flat, and display an image using Table 4 when the display 120 is curved. However, the present disclosure is not limited thereto.

TABLE 3

| Aspect Ratio (Width:Height) | Horizontal Angle of View | Vertical Angle of View | Reproducing Method | Reproducing Parameter |
|---|---|---|---|---|
| 1:1 | 100 | 100 | Rectilinear | — |
| 4:3 | 124 | 100 | Pannini | 0.35 |
| 16:9 | 155 | 100 | Pannini | 0.52 |
| 2:1 | 158 | 98 | Pannini | 0.61 |
| 21:9 | 160 | 92 | Pannini | 0.73 |
| 3:1 | 160 | 65 | Stereographic | — |
| 3:4 | 110 | 137 | Pannini | 0.41 |
| 9:16 | 110 | 162 | Pannini | 0.74 |

TABLE 4

| Curvature | Aspect Ratio (Width:Height) | 1:1 | 16:9 |
|---|---|---|---|
| 1800R | Horizontal Angle of View | 100 | 177 |
| | Vertical Angle of View | 100 | 100 |
| | Reproducing Method | Cylindrical | Cylindrical |
| | Reproducing Parameter | — | — |
| 3000R | Horizontal Angle of View | 100 | 164 |
| | Vertical Angle of View | 100 | 100 |
| | Reproducing Method | Pannini | Stereographic |
| | Reproducing Parameter | 0.22 | — |
| 4200R | Horizontal Angle of View | 100 | 161 |
| | Vertical Angle of View | 100 | 100 |
| | Reproducing Method | Pannini | Pannini |
| | Reproducing Parameter | 0.15 | 0.68 |

Figure 6B:
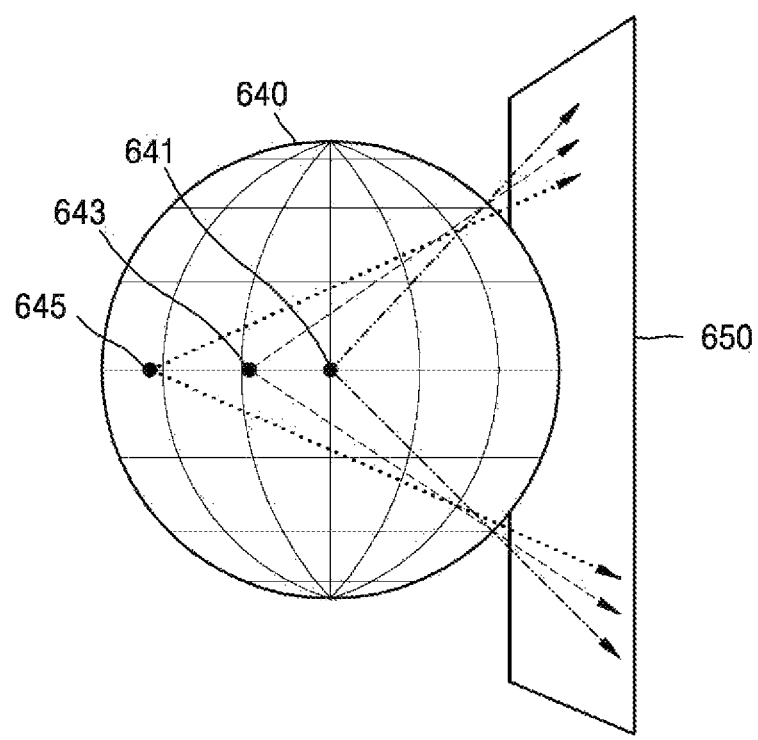
FIG. 6B is a view for describing a method of reproducing an image and a method of obtaining a parameter in the electronic apparatus according to various embodiments.

According to various embodiments, a reproduction parameter may vary according to the method of reproducing the image. Alternatively, there may be no reproduction parameter according to the method of reproducing the image. FIG. 6B is a view for describing a situation in which the electronic apparatus 100 calculates a reproduction parameter when a 360 degree image is reproduced using a Pannini projection reproducing method.

Referring to FIG. 6B, a 360 degree image (not illustrated) may be displayed by mapping to a sphere 640. The electronic apparatus 100 may reproduce a region of the 360 degree image mapped to the sphere 640 in the form of projecting on a plane 650. The plane 650 may be, for example, a plane or screen being displayed. In this case, the electronic apparatus 100 may change a position of an image projection start point in order to reduce distortion of the reproduced image. For example, the electronic apparatus 100 may project an image from a center point 641 of the sphere 640 as a projection start point toward the plane 650.

According to various embodiments, the electronic apparatus 100 may select a point further away from the plane 650 on which an image is displayed with respect to the center point 641 of the sphere 640 as a projection start point and project the image. For example, the electronic apparatus 100 may select a first point 643 or a second point 645 as a projection start point and project an image.

In this case, the reproduction parameter may be a distance from the center of a sphere to a projection starting point of the sphere or a radius of the sphere. Therefore, when the center point 641 of the sphere 640 is a projection starting point, the reproduction parameter may be 0. As the projection starting point gradually moves away from the center point 641 of the sphere 640, an absolute value of the reproduction parameter may be gradually increased.

Referring to Table 3, as a horizontal angle of view of an image which will be reproduced is reduced, a value of a reproduction parameter of the electronic apparatus 100 according to various embodiments may be reduced and an absolute value thereof may be increased.

Referring again to operation 450, the electronic apparatus 100 may generate a display image according to the determined angle of view and the determined reproducing method and display the display image on the display 120.

According to various embodiments, the electronic apparatus 100 may convert an RGB color space into a YUV color space with respect to a region of the spherical 360 degree image, which will be displayed. In this case, the electronic apparatus 100 may convert the RGB color space into the YUV color space using a conversion formula. Additionally, the electronic apparatus 100 may perform image quality processing on the image which will be displayed to display the image on the display 120.

FIGS. 7A to 9B are views for describing situations in which a display range (or an angle of view) of a reproduced image varies according to various types of electronic apparatuses.

Figure 7A:
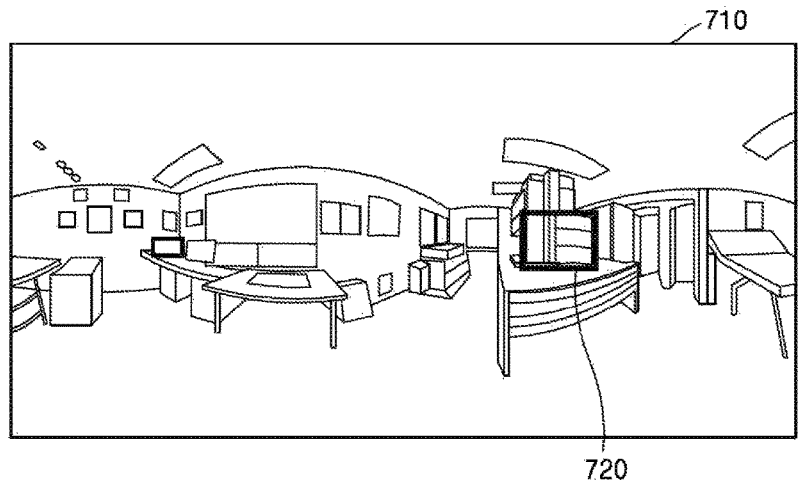
FIGS. 7A to 9B are views for describing situations in which a display range (or an angle of view) of an image to be reproduced varies according to various types of electronic apparatuses.
Figure 7B:
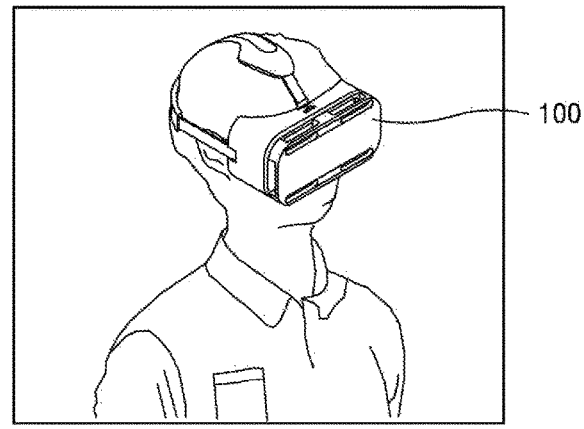
Figure 7C:
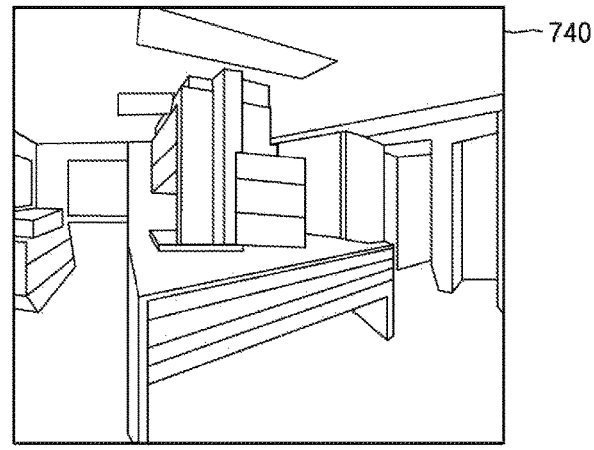

FIGS. 7A to 7C are views for describing situations in which a display range of an image to be reproduced varies when the electronic apparatus according to various embodiments is an HMD device.

Referring to FIG. 7A, the electronic apparatus 100 according to various embodiments may display a 360 degree image 710. The 360 degree image 710 according to various embodiments may be an image having a 360 degree angle of view.

According to various embodiments, as described above, the 360 degree image may be an image, which has been stored in the storage 190 of the electronic apparatus 100 or input from the camera 132. The electronic apparatus 100 may convert a 2D 360 degree image 710 into a spherical 360 degree image and reproduce the spherical 360 degree image. The electronic apparatus 100 may display a selected 360 degree image 710 based on a center point 720 of the 360 degree image 710. The center point 720 may be a preset point or a point pre-selected by the user. Alternatively, the center point 720 may be a feature point of the 360 degree image 710. The feature point may be, for example, a point at which a face of a subject is recognized, a point at which a contrast value is high, or a capturing start point of a 360 degree image.

Referring to FIG. 7B, the electronic apparatus 100 is an HMD device, and the user may view the 360 degree image 710 using the HMD device 100. The HMD device 100 may include a device using an untethered VR method in which a display of an external electronic apparatus, such as a smartphone, is used as a display. Alternatively, the HMD device 100 may include a device using a tethered VR method in which an HMD device itself has a display. FIG. 7B may illustrate a driving method based on an untethered VR method.

According to various embodiments, an external electronic apparatus (not illustrated) may output an image for a left eye and an image for a right eye to a display, the HMD device 100 may process the images of the external electronic apparatus through a built-in lens assembly, and thus the user may view the processed images, for example, augmented reality (AR) through a see-through function or virtual reality (VR) using a see-closed function.

Referring to FIG. 7C, the user may view a region 740 of the 360 degree image 710 using the HMD device 100. When the electronic apparatus 100 according to various embodiments is the HMD device 100, the region 740 that the user may view may have a horizontal 100 degree angle of view similar to a human viewing angle. In this case, when the user moves his or her face in a certain direction, the HMD device 100 may reproduce the 360 degree image while changing the display region on the basis of the movement of the user's face.

Figure 8A:
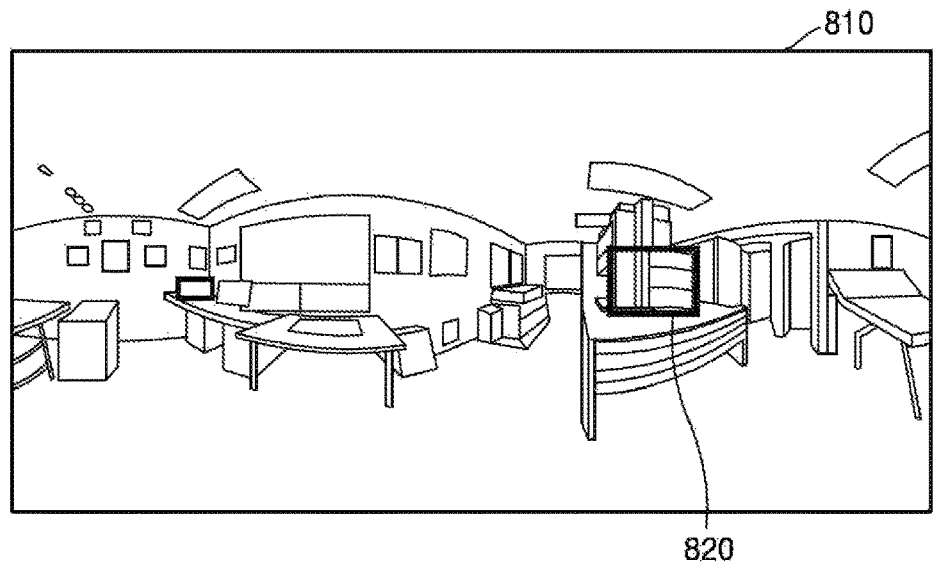
Figure 8B:
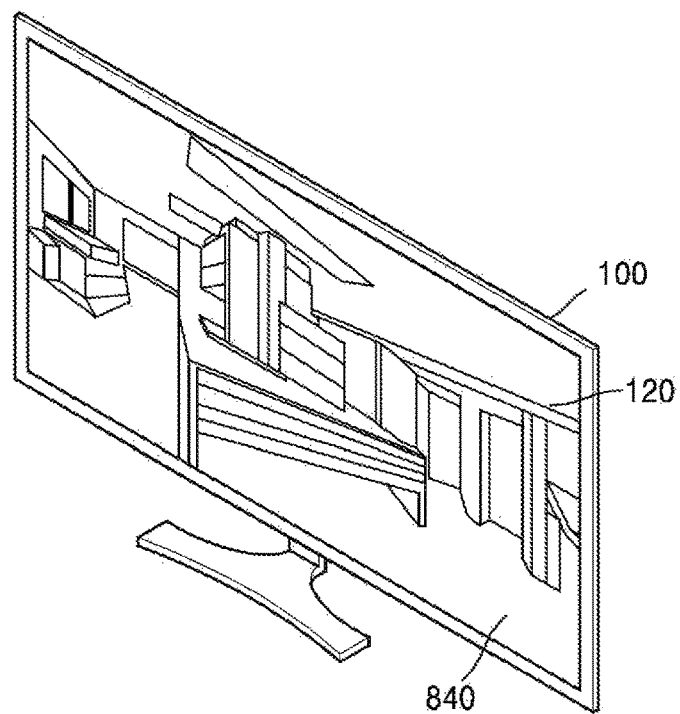

FIGS. 8A and 8B are views for describing situations in which a display range of an image to be reproduced varies when the electronic apparatus according to various embodiments includes a flat display.

Referring to FIG. 8A, the electronic apparatus 100 according to various embodiments may display a 360 degree image 810. The 360 degree image 810 according to various embodiments may be an image having a 360 degree angle of view.

According to various embodiments, as described above, the 360 degree image may be an image, which has been stored in the storage 190 of the electronic apparatus 100 or input from the camera 132. The electronic apparatus 100 may convert a 2D 360 degree image 810 into a spherical 360 degree image and reproduce the spherical 360 degree image. The electronic apparatus 100 may display a selected 360 degree image 810 based on a center point 820 of the 360 degree image 810. The center point 820 may be a preset point or a point pre-selected by the user.

Referring to FIG. 8B, the electronic apparatus 100 may reproduce the 360 degree image 810. The electronic apparatus 100 may determine a region of the 360 degree image 810 which will be displayed on the display 120, that is, an angle of view, on the basis of the aspect ratio information of the display 120 and the type and curvature information of the display 120.

For example, as illustrated in FIG. 8B, the display 120 of the electronic apparatus 100 may have an aspect ratio of 16:9 and may be configured as a flat display. In this case, referring to Table 1 for FIG. 5 described above, a horizontal angle of view of an image which will be displayed on the display 120 may be 155 degrees, and a vertical angle of view thereof may be 100 degrees. Therefore, the electronic apparatus 100 may display a region having a horizontal angle of view of 155 degrees and a vertical angle of view of 100 degrees with respect to the center point 820.

For example, when the display 120 is a flat display having an aspect ratio of 4:3, the electronic apparatus 100 may display an image of the 360 degree image 810, which has a horizontal angle of view of 124 degrees and a vertical angle of view of 100 degrees with respect to the center point 820.

According to various embodiments, the electronic apparatus 100 may be controlled by an external controller (not illustrated) such as a remote controller or a smart phone. For example, the electronic apparatus 100 may change a displayed region 840 of the 360 degree image 810 on the basis of a signal input from the external controller. Therefore, the user may control the electronic apparatus 100 using the external controller so that a region, which is not currently displayed, of the 360 degree image is displayed.

Figure 9A:
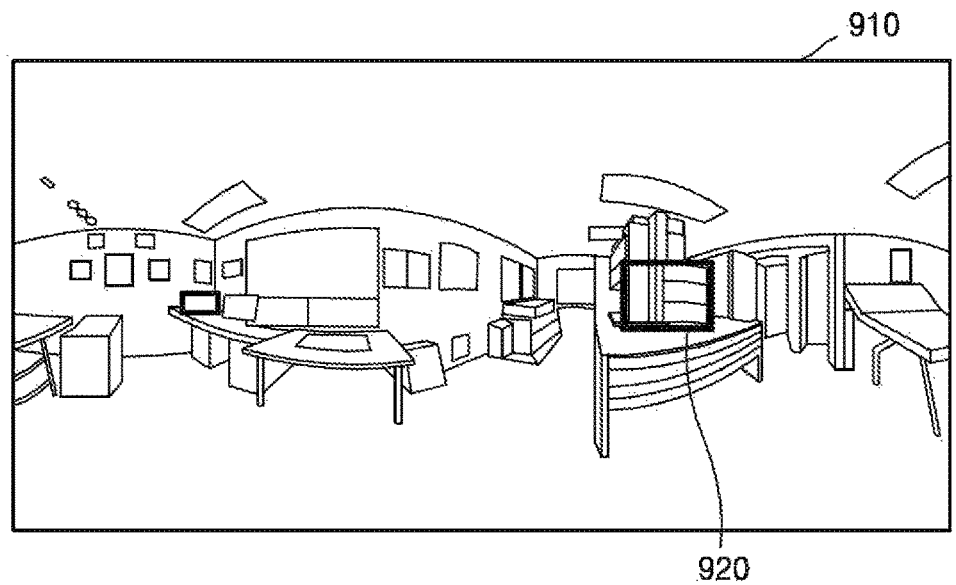
Figure 9B:
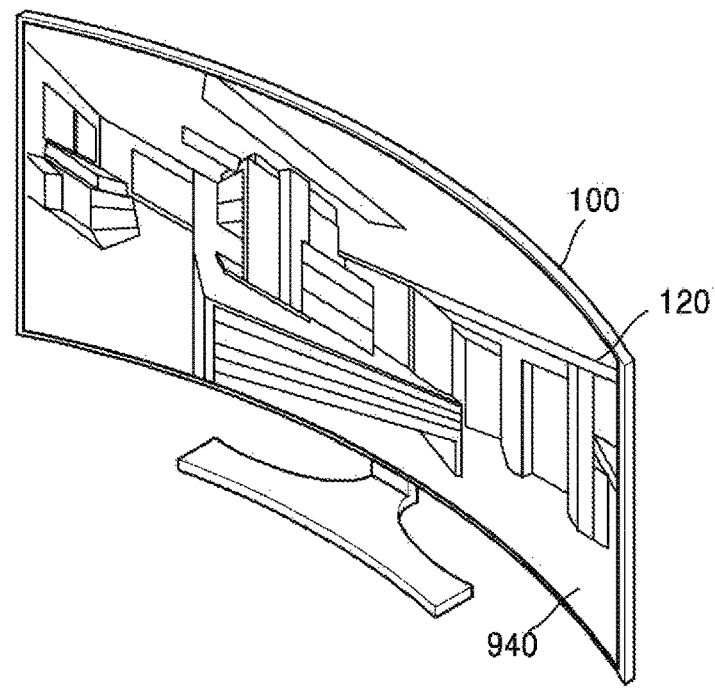

FIGS. 9A and 9B are views for describing situations in which a display range of an image to be reproduced varies when the electronic apparatus according to various embodiments includes a curved display.

Referring to FIG. 9A, the electronic apparatus 100 according to various embodiments may display a 360 degree image 910. The 360 degree image 910 according to various embodiments may be an image having a 360 degree angle of view.

According to various embodiments, as described above, the 360 degree image may be an image, which has been stored in the storage 190 of the electronic apparatus 100 or input from the camera 132. The electronic apparatus 100 may convert a 2D 360 degree image 910 into a spherical 360 degree image and reproduce the spherical 360 degree image. The electronic apparatus 100 may display a selected 360 degree image 910 based on a center point 920 of the 360 degree image 910. The center point 920 may be a preset point or a point pre-selected by the user.

Referring to FIG. 9B, the electronic apparatus 100 may reproduce the 360 degree image 910. The electronic apparatus 100 may determine a region of the 360 degree image 910, which will be displayed on the display 120, that is, an angle of view, on the basis of the aspect ratio information the display 120 and the type and curvature information of the display 120.

For example, as illustrated in FIG. 8B, the display 120 of the electronic apparatus 100 may have an aspect ratio of 16:9 and may be configured as a curved display. The display 120 may have a curvature of 1800 R. In this case, referring to Table 2 for FIG. 5 described above, a horizontal angle of view of an image which will be displayed on the display 120 may be 177 degrees, and a vertical angle of view thereof may be 100 degrees. Therefore, the electronic apparatus 100 may display a region having a horizontal angle of view of 177 degrees and a vertical angle of view of 100 degrees with respect to the center point 920.

For example, when the display 120 has an aspect ratio of 4:3 and a curvature of 1800 R, the electronic apparatus 100 may display an image of the 360 degree image 910, which has a horizontal angle of view of 133 degrees and a vertical angle of view of 100 degrees with respect to the center point 920.

According to various embodiments, the electronic apparatus 100 may be controlled by an external controller (not illustrated) such as a remote controller or a smart phone. For example, the electronic apparatus 100 may change a displayed region 940 of the 360 degree image 910 on the basis of a signal input from the external controller.

Figure 10A:
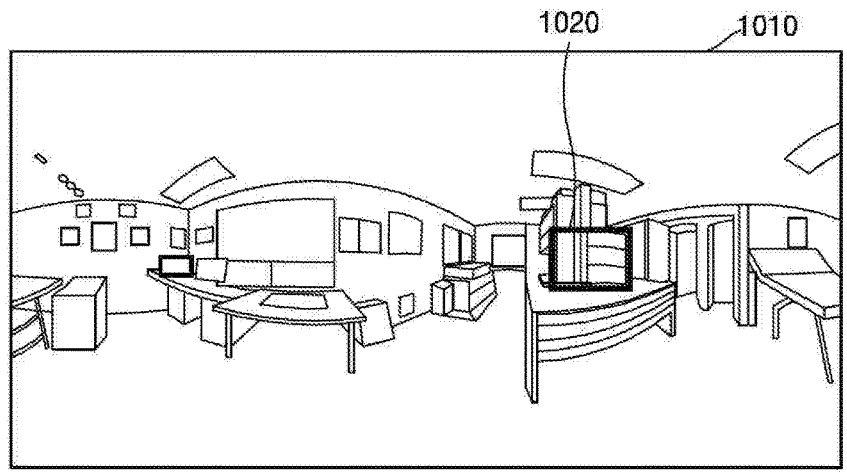
FIGS. 10A to 10C are views for describing situations in which an image to be displayed is changed according to a method of reproducing an image in the electronic apparatus according to various embodiments.
Figure 10B:
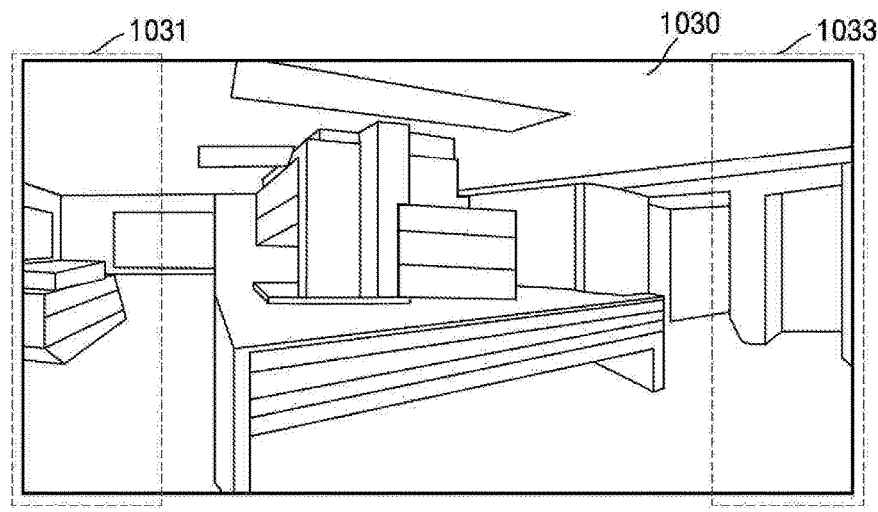
Figure 10C:
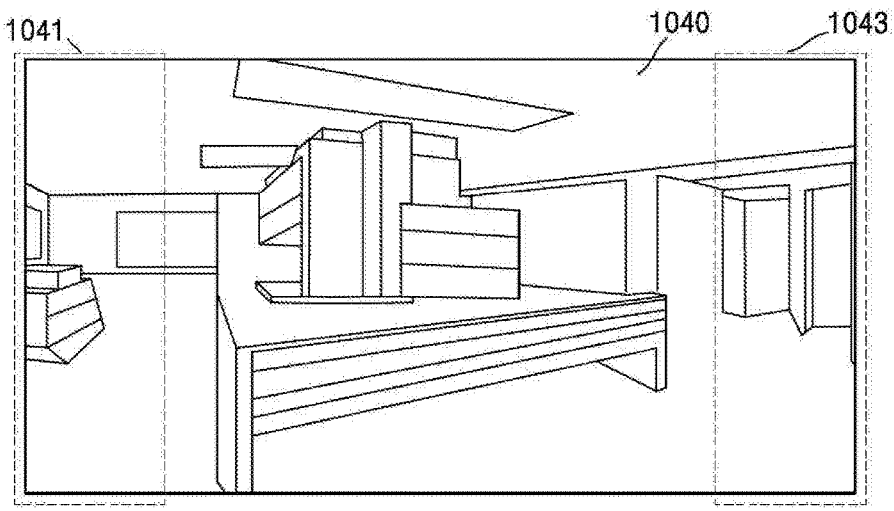

FIGS. 10A to 10C are views for describing situations in which an image to be displayed is changed according to a method of reproducing an image in the electronic apparatus according to various embodiments.

The electronic apparatus 100 may reproduce a 360 degree image 1010 by applying various methods. For example, as described above, the electronic apparatus 100 may use reproducing methods such as a rectilinear projection reproducing method, a Pannini projection reproducing method, a stereographic projection reproducing method, and the like. However, the method of reproducing the 360 degree image is not limited thereto.

Hereinafter, situations in which the same image is differently displayed according to the reproducing method will be described.

Referring to FIG. 10A, the electronic apparatus 100 according to various embodiments may display the 360 degree image 1010. The 360 degree image 1010 according to various embodiments may be an image having a 360 degree angle of view.

The electronic apparatus 100 may convert a 2D 360 degree image 1010 into a spherical 360 degree image and reproduce the spherical 360 degree image. The electronic apparatus 100 may display the 360 degree image 1010 with respect to a preset center point 1020.

Referring to FIGS. 10B and 10C, the electronic apparatus 100 may reproduce the 360 degree image 1010. The electronic apparatus 100 may determine a region of the 360 degree image 1010, which will be displayed on the display 120, that is, an angle of view, on the basis of the aspect ratio information of the display 120 and the type and curvature information of the display 120. Also, the electronic apparatus 100 may determine a reproducing method on the basis of the determined angle of view and curvature information.

For example, as illustrated in FIG. 10B, the display 120 of the electronic apparatus 100 may have an aspect ratio of 16:9 and may be configured as a curved display. The display 120 may have a curvature of 4200 R. In this case, the electronic apparatus 100 may determine a horizontal angle of view of an image which will be displayed on the display 120 as 161 degrees and a vertical angle of view thereof as 100 degrees. The electronic apparatus 100 may reproduce a first image 1030 using a rectilinear projection reproducing method.

Referring to FIG. 10C, as described above, when the display 120 has an aspect ratio of 16:9 and a curvature of 4200 R, the electronic apparatus 100 according to various embodiments may display a second image 1040 having a horizontal angle of view of 161 degrees and a vertical angle of view of 100 degrees with respect to the center point 1020 of the 360 degree image 1010 using a Pannini projection reproducing method.

When a reproduction screen of FIG. 10B is compared to a reproduction screen of FIG. 10C, it may be seen that there is a difference between two images. For example, it may be seen that there are differences in form between left portions 1031 and 1041 of the first image 1030 and the second image 1040 and between right portions 1033 and 1043 of the first image 1030 and the second image 1040 even though the images are images for the same subject. Horizontally elongated distortion occurs in the right portion 1033 and the left portion 1031 of the first image 1030 when compared to the right portion 1043 and the left portion 1041 of the second image 1040. Therefore, the electronic apparatus 100 may minimize the distortion of an image to be reproduced by applying a Pannini projection reproducing method among the above-described two reproducing methods. When the electronic apparatus 100 reproduces an image using a Pannini projection reproducing method, the electronic apparatus 100 may further reduce the distortion which occurs in the reproduced image by adjusting the above-described reproduction parameter.

Figure 11A:
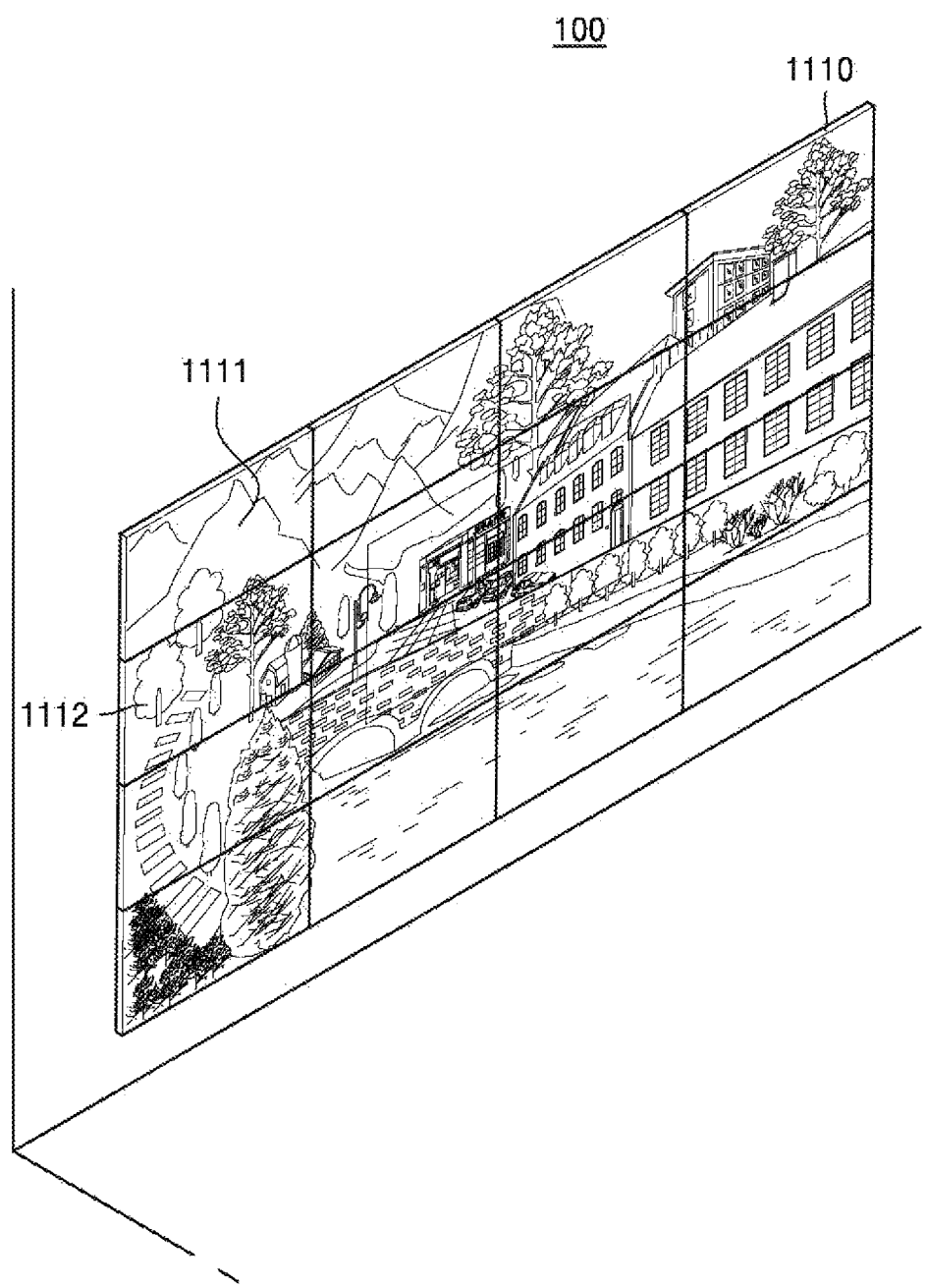
FIGS. 11A to 11C are views for describing situations in which an image is displayed by combining a plurality of flat display units in the electronic apparatus according to various embodiments.
Figure 11B:
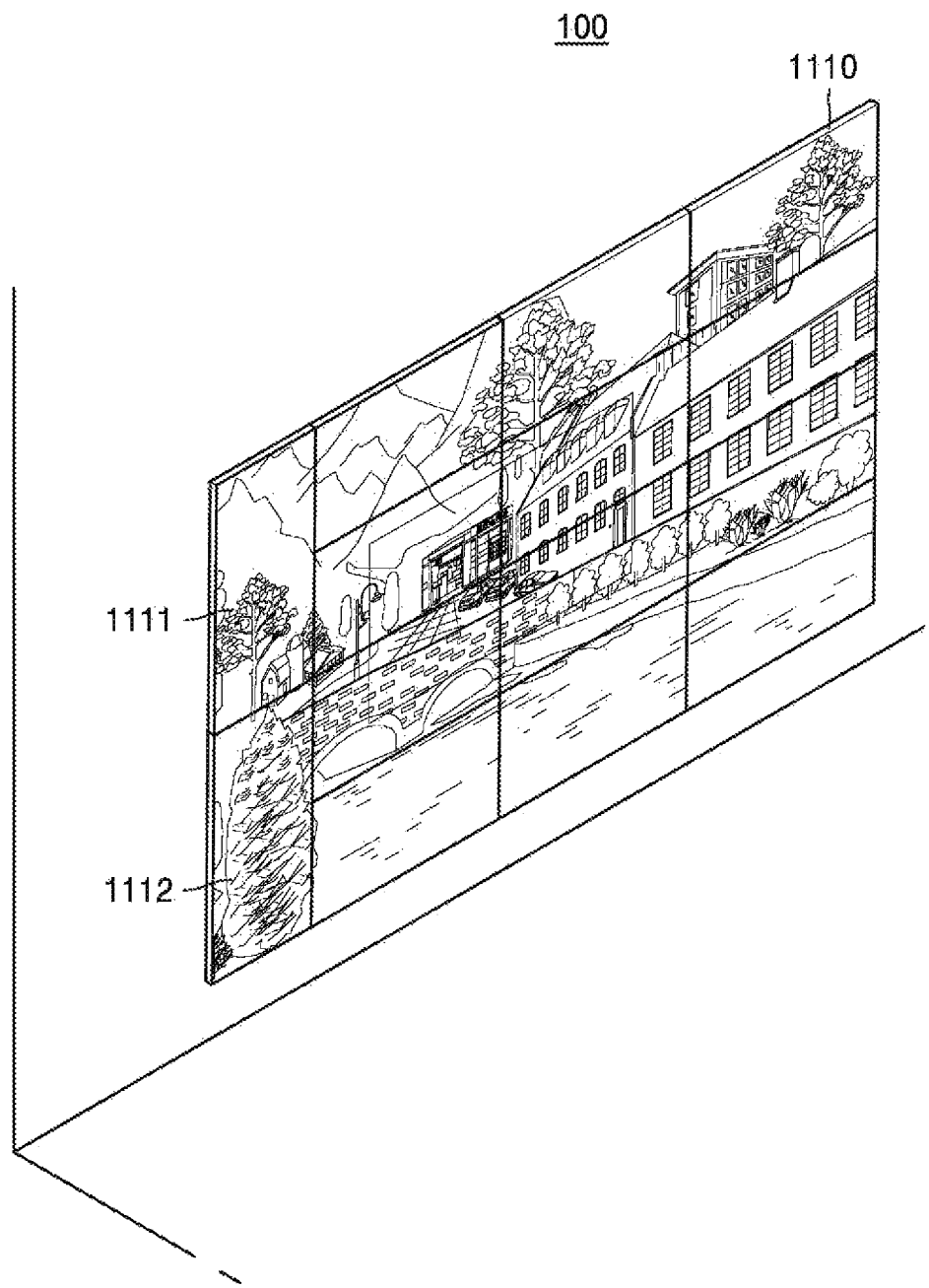
Figure 11C:
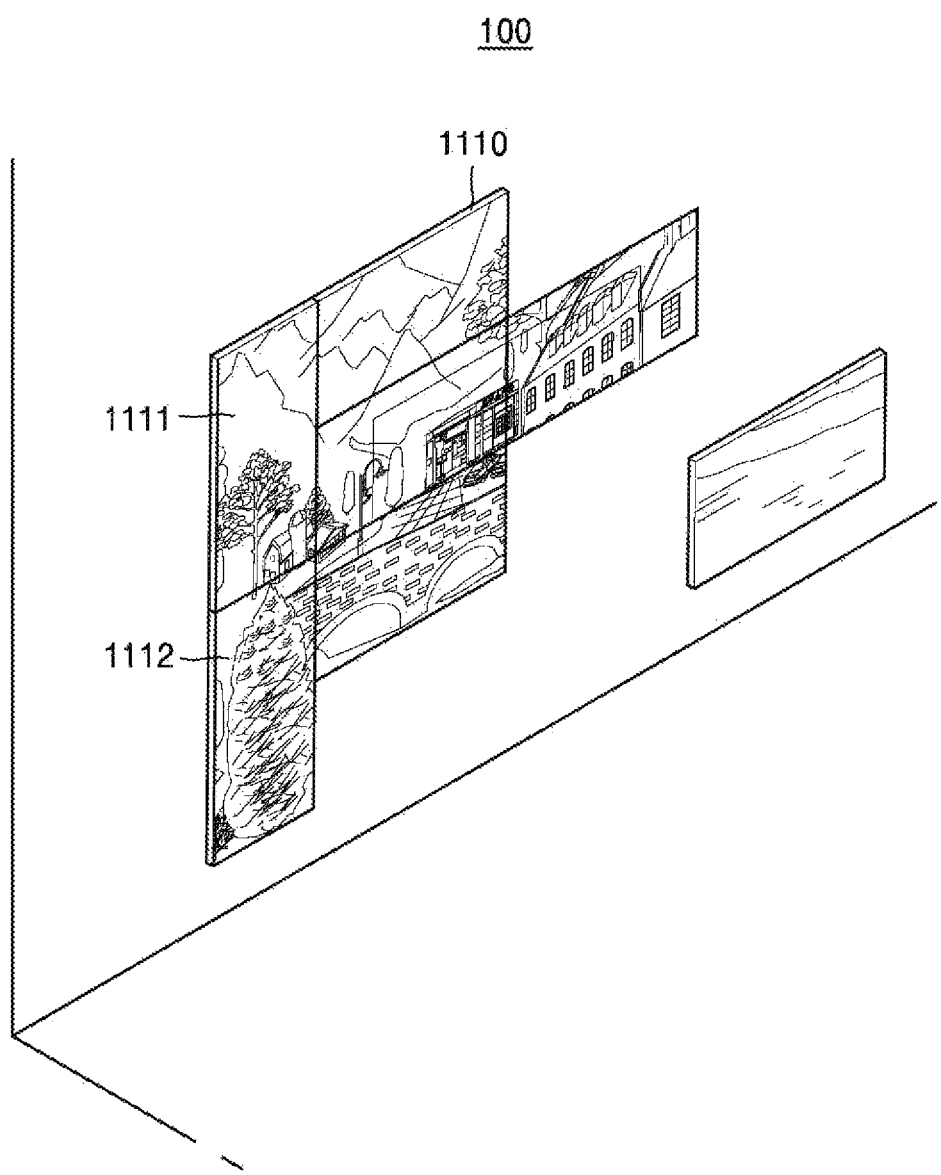

FIGS. 11A to 11C are views for describing situations in which an image is displayed by combining a plurality of flat display units in the electronic apparatus according to various embodiments. Hereinafter, description will be made assuming a case in which a single display 1110 is formed by combining a plurality of display units will be described with reference to FIGS. 11A to 11C.

Referring to FIG. 11A, the electronic apparatus 100 may reproduce a single image by combining a plurality of display units. The electronic apparatus 100 according to various embodiments may display a 360 degree image (not illustrated). The electronic apparatus 100 may display a region with respect to a preset point of the 360 degree image on the display 1110.

The electronic apparatus 100 may determine a region of the 360 degree image, which will be displayed on the display 1110, that is, an angle of view, on the basis of aspect ratio information of the display 1110 and a type and curvature information of the display 1110.

For example, as illustrated in FIG. 11A, the display 1110 of the electronic apparatus 100 may have an aspect ratio of 16:9 and may be configured as a flat display. In this case, referring to Table 1 of FIG. 5 described above, a horizontal angle of view of an image which will be displayed on the display 1110 may be 155 degrees, and a vertical angle of view thereof may be 100 degrees. Therefore, the electronic apparatus 100 may display a region having a horizontal angle of view of 155 degrees and a vertical angle of view of 100 degrees with respect to the preset point.

The electronic apparatus 100 according to various embodiments may change a position of each of the display units constituting the display 1110. For example, the position of each of the plurality of display units may be changed by using a link and a motor structure. For example, the link and motor structure could change a position of one of the display units, or more than one of the display units. Further, the user may separate some of the disposed display units and combine the remaining display units as a different type of display 1110. In this case, the positions of the display units are changed and thus an aspect ratio of the display 1110 may be changed.

For example, as illustrated in FIG. 11B, the electronic apparatus 100 may change preset positions of display units 1111 and 1112 among the plurality of display units (compare to FIG. 11A). Therefore, the display 1110 of the electronic apparatus 100 may have an aspect ratio of 4:3. In this case, the electronic apparatus 100 may display a region of the 360 degree image, which has a horizontal angle of view of 124 degrees and a vertical angle of view of 100 degrees with respect to a preset point.

The electronic apparatus 100 according to various embodiments may reproduce an image on some display units of the plurality of display units.

As illustrated in FIG. 11C, the electronic apparatus 100 may reproduce an image even in the absence of some display units. In this case, the electronic apparatus 100 may calculate an aspect ratio of the entire display 1110 using the remaining display units. In such a case, the electronic apparatus can calculate an aspect ratio by extrapolating to determine a virtual perimeter formed by a rectangle or other shape that surrounds the remaining display units. For example, with regard to FIG. 11C, a virtual rectangle that surrounds and contacts displays 1111, 1112, and the display shown in the lower right-hand corner can be extrapolated based on the positions and size of each display. When the display 1110 is curved, the electronic apparatus 100 may calculate a curvature of the entire display 1110 using the remaining display units in a similar manner by extrapolating based on the remaining displays. The electronic apparatus 100 may reproduce the image using the calculated curvature and aspect ratio.

FIG. 12 is a view for describing a situation in which an image is displayed by combining a plurality of curved displays in the electronic apparatus according to various embodiments.

Referring to FIG. 12, the electronic apparatus 100 may reproduce a single image using a plurality of displays 1211, 1212, and 1213. The electronic apparatus 100 may be electrically connected to the plurality of displays 1211, 1212, and 1213 using a wired or wireless communication method. The electronic apparatus 100 according to various embodiments may display a 360 degree image (not illustrated). The electronic apparatus 100 may display a region with respect to a preset point of the 360 degree image on the plurality of displays 1211, 1212, and 1213.

Referring to FIG. 12, the electronic apparatus 100 may reproduce the 360 degree image. The electronic apparatus 100 may calculate aspect ratio information, in a state in which the plurality of displays 1211, 1212, and 1213 are disposed, using aspect ratio information of each of the displays 1211, 1212, and 1213. Further, the electronic apparatus 100 may calculate curvature information, in a state in which the plurality of displays 1211, 1212, and 1213 are disposed, using a type and curvature information of each of the displays 1211, 1212, and 1213. The electronic apparatus 100 may determine a region of the 360 degree image 910, which will be displayed on the displays 1211, 1212, and 1213, that is, an angle of view, using the calculated curvature information and aspect ratio information.

For example, as illustrated in FIG. 12, the electronic apparatus 100 may calculate that an aspect ratio of each of the plurality of displays 1211, 1212, and 1213 is 21:9. Further, the electronic apparatus 100 may calculate that a curvature of each of the plurality of displays 1211, 1212, and 1213 is 1800 R. In this case, referring to Table 2, a horizontal angle of view of an image which will be displayed on the displays 1211, 1212, and 1213 may be 233 degrees and a vertical angle of view thereof may be 100 degrees. Therefore, the electronic apparatus 100 may display a region having a horizontal angle of view of 233 degrees and a vertical angle of view of 100 degrees with respect to a preset point.

FIGS. 13A to 13D are views for describing a method of reproducing an image in the electronic apparatuses having a cylindrical display according to various embodiments.

Figure 13A:
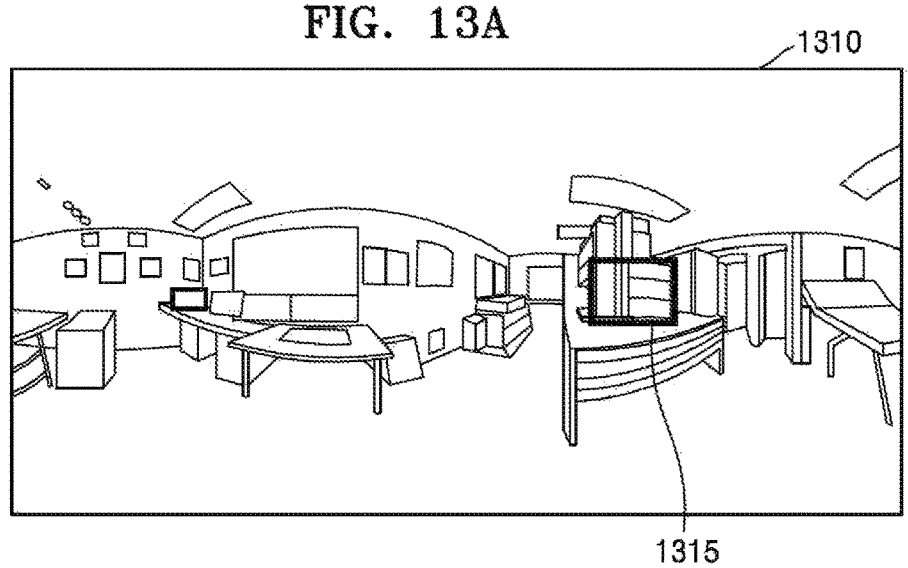
FIGS. 13A to 13D are views for describing a method of reproducing an image in an electronic apparatus having a cylindrical display according to various embodiments.

Referring to FIG. 13A, the electronic apparatus 100 according to various embodiments may display a 360 degree image 1310. The 360 degree image 1310 according to various embodiments may be an image having an angle of view of 360 degrees.

The electronic apparatus 100 may convert a 2D 360 degree image 1310 into a spherical 360 degree image and reproduce the spherical 360 degree image. The electronic apparatus 100 may display the 360 degree image 1310 based on a preset position 1315 in the 360 degree image 1310.

When the electronic apparatus 100 according to various embodiments includes a cylindrical curved display, the electronic apparatus 100 may display an image based on a curvature of the display.

Figure 13B:
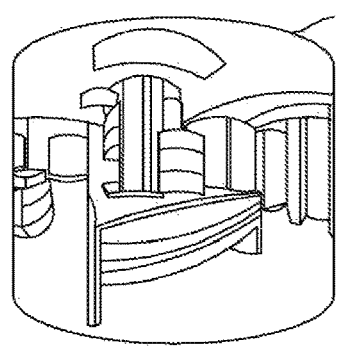
Figure 13C:
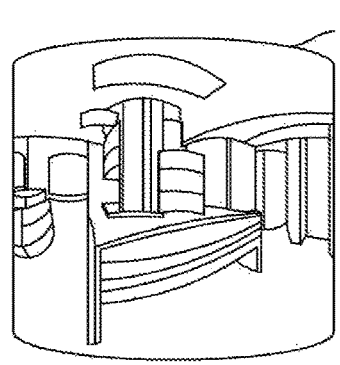
Figure 13D:
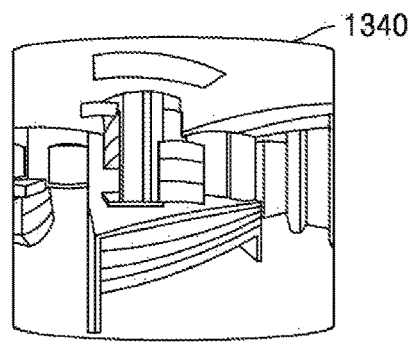

Referring to FIG. 13B, the electronic apparatus 100 may display images differently according to the curvature of the display. For example, the electronic apparatus 100 may display a first image 1320 when the curvature of the display has a large value, display a third image 1340 when the curvature of the display has a small value, and display a second image 1330 when the curvature of the display has an intermediate value between the large and small values.

According to various embodiments, when the electronic apparatus 100 reproduces the first image 1320, the electronic apparatus 100 may reproduce the first image 1320 using a reproducing method in which distortion occurs in upper and lower portions of the display by reflecting a large curvature value. Further, when the electronic apparatus 100 reproduces the third image 1340, the electronic apparatus 100 may reproduce the third image 1340 using a reproducing method in which less distortion occurs in upper and lower portions of the display by reflecting a small curvature value.

According to various embodiments, even when the same reproducing method is used, the electronic apparatus 100 may cause more distortion or less distortion in the image according to the curvature of the display using the above-described reproduction parameter.

The electronic apparatus according to various embodiments of the present disclosure includes a display for displaying an image and a controller which is electrically connected to the display, wherein the controller determines an image which will be displayed on the display, identifies aspect ratio information of the display, determines a display range of the image, which will be displayed on the display, on the basis of the identified aspect ratio information of the display, and thus an image that the user can easily view according to a characteristic of each electronic device can be displayed.

The term a "module" used herein may include units configured of hardware, software or firmware and may be used interchangeably with terms such as logic, a logic block, a part, or a circuit. The module may be an integrally constructed part, a minimum unit that performs one or more functions, or a part thereof. The module may be implemented either mechanically or electronically and may include, for example, an application-specific integrated circuit (ASIC) chip, field-programmable gate arrays (FPGAs), or programmable logical devices, that perform certain operations and are known or will be developed in the future. At least one of devices (e.g., modules or functions thereof) or methods (e.g., operations) according to various embodiments may be implemented as instructions stored in a non-transitory computer-readable storage medium (e.g., a storage 190) in the form of program modules. When the instructions are executed by a processor (e.g., a processor 183), the processor may perform a function corresponding to the instructions. The non-transitory computer-readable recording medium may include a hard disk, a floppy disk, a magnetic medium (e.g., a magnetic tape), an optical recording medium (e.g., a CD-ROM, a DVD, a magnetic-optical medium such as a floppy disk), and a built-in memory. The instructions may include code generated by a compiler or code that may be executed by an interpreter. Modules or program modules according to various embodiments may include at least one or more of the elements described above, some elements may be omitted, or other elements may be further included. Operations performed by modules, program modules, or other components according to various embodiments may be performed sequentially, in parallel, repetitively, or heuristically, or at least some operations may be performed in a different order or omitted, or other operations may be added.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An electronic apparatus comprising:
    a display;
    a controller electrically connected to the display; and
    a storage that stores a lookup table that indicates aspect ratio information of the display and an angle of view which matches the aspect ratio information,
    wherein the controller is configured to:
        identify the aspect ratio information of the display,
        determine an angle of view of a 360 degree image to be displayed on the display based on the identified aspect ratio information of the display, using the lookup table, and
        control the display to display a region of the 360 degree image based on the determined angle of view.

2. The electronic apparatus of claim 1, wherein the controller is further configured to:
    determine a method of reproducing an image, based on the determined angle of view, a type of the display which indicates whether the display is flat or curved, and curvature information of the display, and
    control the display to display the region corresponding to the determined angle of view on the display, based on the determined method of reproducing the image.

3. The electronic apparatus of claim 2, wherein:
    the display includes a first display and a second display; and
    the controller is further configured to:
        obtain the type of the display and the curvature information of the display based on a type of the first display and curvature information of the first display, and a type of the second display and curvature information of the second display, and
        determine the angle of view of the 360 degree image to be displayed on the display based on the obtained type of the display and the curvature information of the display.

4. The electronic apparatus of claim 1, wherein:
    the display comprises a first display and a second display; and
    the controller is further configured to:
        obtain the aspect ratio information of the display based on aspect ratio information of the first display and aspect ratio information of the second display, and
        determine the angle of view of the 360 degree image to be displayed on the display based on the obtained aspect ratio information of the display.

5. The electronic apparatus of claim 1, wherein the storage stores another lookup table storing the aspect ratio information and curvature information of the display, and an angle of view which matches the aspect ratio information and the curvature information,
    wherein the controller is further configured to determine the angle of view of the 360 degree image to be displayed on the display based on the other lookup table.

6. The electronic apparatus of claim 1, further comprising a camera,
    wherein the controller is further configured to control to display the 360 degree image on the display based on data generated by the camera.

7. The electronic apparatus of claim 1,
    wherein the controller is further configured to control to display the 360 degree image on the display based on 360 degree image data which is pre-stored in the storage.

8. The electronic apparatus of claim 1, wherein the controller is further configured to:
    identify curvature information of the display, and
    determine the angle of view of the 360 degree image to be displayed on the display based on the identified aspect ratio information of the display, a type of the display, and the curvature information of the display.

9. A method of operating an electronic apparatus, the method comprising:
    storing a lookup table that indicates aspect ratio information of a display of the electronic apparatus and an angle of view which matches the aspect ratio information;
    identifying aspect ratio information of the display of the electronic apparatus;

determining an angle of view of a 360 degree image to be displayed on the display based on the identified aspect ratio information of the display, using the lookup table; and displaying a region of the 360 degree image based on the determined angle of view.

10. The method of claim 9, further comprising:

determining a method of reproducing an image based on the determined angle of view, a type of the display which indicates whether the display is flat or curved, and curvature information of the display; and displaying the region of the 360 degree image corresponding to the determined angle of view on the display, based on the determined method of reproducing the image.

11. The method of claim 9, wherein:

the display includes a first display and a second display; and the method further comprises:

obtaining the aspect ratio information of the display based on aspect ratio information of the first display and aspect ratio information of the second display; and determining the angle of view of the 360 degree image to be displayed on the display based on the obtained aspect ratio information of the display.

12. The method of claim 9, wherein:

the display includes a first display and a second display; and the method further comprises:

obtaining a type of the display and curvature information of the display based on a type of the first display and curvature information of the first display, and a type of the second display and curvature information of the second display; and determining an angle of view of the 360 degree image to be displayed on the display based on the obtained type of the display and the curvature information of the display.

13. The method of claim 9, further comprising:

storing another lookup table that indicates the aspect ratio information and curvature information of the display, and an angle of view which matches the aspect ratio information and the curvature information; and determining an angle of view of the 360 degree image to be displayed on the display based on the other lookup table.

14. The method of claim 9, wherein:

the electronic apparatus includes a camera; and the method further comprises displaying the 360 degree image on the display based on data generated by the camera.

15. The method of claim 9, wherein:

the electronic apparatus includes a storage; and the method further comprises displaying the 360 degree image on the display based on 360 degree image data pre-stored in the storage.

16. The method of claim 9, further comprising:

identifying curvature information of the display; and determining the angle of view of the 360 degree image to be displayed on the display based on the identified aspect ratio information of the display, a type of the display, and the curvature information of the display.

17. A non-transitory computer-readable recording medium in which instructions for performing a method of operating an electronic apparatus including a display are stored, the method of operating the electronic apparatus comprising:

storing a lookup table that indicates aspect ratio information of the display and an angle of view which matches the aspect ratio information;

identifying the aspect ratio information of the display of the electronic apparatus;

determining an angle of view of a 360 degree image to be displayed on the display based on the identified aspect ratio information of the display, using the lookup table; and displaying a region of the 360 degree image based on the determined angle of view.

18. The non-transitory computer-readable recording medium of claim 17, the method of operating the electronic apparatus further comprising:

identifying curvature information of the display; and determining the angle of view of the 360 degree image to be displayed on the display based on the identified aspect ratio information of the display, a type of the display, and the curvature information of the display.

19. An electronic apparatus comprising:

a display;

a storage that stores a lookup table that indicates aspect ratio information of the display and an angle of view which matches the aspect ratio information; and a controller electrically connected to the display and configured to control the display, wherein the controller is configured to:

identify the aspect ratio information of the display, and a type of the display which indicates whether the display is flat or curved, determine a vertical angle of view of a 360 degree image and a horizontal angle of view of the 360 degree image to be displayed on the display based on the aspect ratio information of the display, and the type of the display, using the lookup table, and control the display to display a region of the 360 degree image based on the determined vertical angle of view and the determined horizontal angle of view.

20. The electronic apparatus of claim 19, wherein the controller is further configured to:

identify curvature information of the display, and determine the vertical angle of view of a 360 degree image and the horizontal angle of view of the 360 degree image to be displayed on the display based on the aspect ratio information, the type of the display, and the curvature information.

21. The electronic apparatus of claim 20, wherein the controller is further configured to:

determine a method of reproducing an image, based on the determined horizontal angle of view, the determined vertical angle of view, the aspect ratio information, the type of the display, and the curvature information of the display, and control the display to display an image corresponding to the determined horizontal angle of view and the determined vertical angle of view on the display, based on the determined method of reproducing the image.

22. The electronic apparatus of claim 19, wherein the controller is further configured to:

identify curvature information of the display, and determine the vertical angle of view of the 360 degree image and the horizontal angle of view of the 360 degree image to be displayed on the display based on the aspect ratio information of the display, the type of the display, and the curvature information of the display.

\* \* \* \* \*